(12) United States Patent
Murphy

(10) Patent No.: US 8,643,497 B2
(45) Date of Patent: *Feb. 4, 2014

(54) INTEGRAL FLUID DETECTION AND CONTAINMENT APPARATUS

(71) Applicant: Kevin M. Murphy, LLC, Paoli, PA (US)

(72) Inventor: Kevin Michael Murphy, Paoli, PA (US)

(73) Assignee: Kevin M. Murphy, LLC, Paoli, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,915

(22) Filed: Oct. 17, 2012

(65) Prior Publication Data

US 2013/0037129 A1    Feb. 14, 2013

Related U.S. Application Data

(63) Continuation-in-part of application No. 13/217,926, filed on Aug. 25, 2011, now abandoned, which is a continuation of application No. 12/366,710, filed on Feb. 6, 2009, now Pat. No. 8,013,749, which is a continuation of application No. 11/517,562, filed on Sep. 7, 2006, now Pat. No. 7,489,253.

(51) Int. Cl.
  *G08B 21/00* (2006.01)

(52) U.S. Cl.
  USPC ........... 340/605; 340/602; 340/603; 340/604; 340/623; 137/312; 137/314; 137/558

(58) Field of Classification Search
  USPC .................. 340/602–605, 612–616, 623; 137/312–314, 558
  See application file for complete search history.

(56) References Cited

U.S. PATENT DOCUMENTS

| 879,486 | A | | 2/1908 | McClellan |
| 1,114,247 | A | | 10/1914 | Gamble |
| 2,006,948 | A | | 7/1935 | Hazard et al. |
| 3,069,671 | A | * | 12/1962 | Taylor ........................ 340/616 |
| 4,037,427 | A | * | 7/1977 | Kramer ........................ 62/128 |
| 4,180,088 | A | | 12/1979 | Mallett |
| 4,487,021 | A | | 12/1984 | Arakawa et al. |

(Continued)

FOREIGN PATENT DOCUMENTS

| EP | 0 196850 B1 | 10/1990 |
| WO | WO 92/20920 A1 | 11/1992 |

*Primary Examiner* — Daniel Wu
*Assistant Examiner* — Son M Tang
(74) *Attorney, Agent, or Firm* — Rita C. Chipperson, Esq.; Chipperson Law Group, PC

(57) ABSTRACT

Disclosed are integral and/or portable, easy-to-install apparatuses for detecting and containing fluid leaked or otherwise discharged from a fluid-filled device and for facilitating testing and maintenance of the apparatus and fluid-filled devices. In one aspect of the disclosed invention, upon sensing a fluid discharge, the apparatus activates audible and/or visual alarms and directs the discharged fluid to a predetermined drainage area to prevent damage to areas surrounding the fluid-filled device. In another aspect of the present invention, no plumbing or electrical wiring is required to install the apparatus, thereby allowing an unskilled individual to easily and inexpensively install the apparatus. In yet another aspect of the present invention, the apparatus may be easily located since it is not dependent on gravity or a drainage pipe for discharge of the fluid. Furthermore, the apparatus optionally includes an integral leveling mechanism to accommodate leveling of the apparatus when placed on uneven surfaces.

25 Claims, 19 Drawing Sheets

(56) References Cited

U.S. PATENT DOCUMENTS

| | | | | |
|---|---|---|---|---|
| 5,188,143 A | * | 2/1993 | Krebs | 137/312 |
| 5,264,368 A | * | 11/1993 | Clarke et al. | 436/3 |
| 5,345,224 A | * | 9/1994 | Brown | 340/605 |
| 5,632,302 A | | 5/1997 | Lenoir, Jr. | |
| 5,645,103 A | | 7/1997 | Whittaker | |
| 5,749,609 A | | 5/1998 | Steele | |
| 5,844,492 A | * | 12/1998 | Buffin, Sr. | 340/632 |
| 5,870,024 A | * | 2/1999 | Arvelo, Jr. | 340/605 |
| 5,881,762 A | * | 3/1999 | Janesky | 137/312 |
| 5,957,545 A | | 9/1999 | Sawada et al. | |
| 6,135,133 A | * | 10/2000 | Ridgeway, Jr. | 137/15.11 |
| 6,276,309 B1 | | 8/2001 | Zeek | |
| 6,543,471 B1 | | 4/2003 | Carroll | |
| 6,736,535 B2 | | 5/2004 | Halsall et al. | |
| 6,962,166 B2 | * | 11/2005 | Dudra | 137/558 |
| 6,997,207 B2 | * | 2/2006 | McKesson | 137/312 |
| 7,042,362 B2 | * | 5/2006 | Pai et al. | 340/605 |
| 7,114,514 B2 | * | 10/2006 | Houle | 137/312 |
| 7,171,978 B2 | * | 2/2007 | Nagler et al. | 137/312 |
| 7,246,636 B2 | | 7/2007 | Dudra et al. | |
| 7,253,741 B2 | * | 8/2007 | Fiorletta et al. | 340/605 |
| 2002/0033759 A1 | | 3/2002 | Morello | |
| 2003/0177818 A1 | | 9/2003 | Bronson | |
| 2004/0161227 A1 | | 8/2004 | Baxter | |
| 2006/0169321 A1 | * | 8/2006 | Houle | 137/312 |
| 2010/0018980 A1 | * | 1/2010 | Oakner et al. | 220/571 |

* cited by examiner

INTEGRAL FLUID DETECTION AND CONTAINMENT APPARATUS

CROSS-REFERENCE TO RELATED APPLICATIONS

This application claims the benefit of and is a continuation-in-part of the U.S. non-provisional patent application entitled "Fluid Detection and Containment Apparatus", having Ser. No. 13/217,926 and filed Aug. 25, 2011, which is a continuation of the U.S. non-provisional patent application entitled "Fluid Detection and Containment Apparatus", having Ser. No. 12/366,710 and filed Feb. 6, 2009, now U.S. Pat. No. 8,013,749, which is a continuation of the U.S. non-provisional patent application entitled "Fluid Detection and Containment Apparatus", having Ser. No. 11/517,562 and filed Sep. 7, 2006, now U.S. Pat. No. 7,489,253, all of which are hereby incorporated by reference in their entireties as if fully set forth herein.

BACKGROUND OF THE INVENTION

Embodiments of the present invention generally relate to apparatuses for detecting and containing leakage or overflow of a fluid-filled device. More specifically, the present invention relates to integral and/or portable, easy-to-install apparatuses for detecting fluid received from a fluid-filled device, activating audible and/or visual alarms, and directing fluid to a predetermined drainage area to prevent damage to areas surrounding the fluid-filled device. The present invention also facilitates testing of fluid-filled devices.

Many systems and methods have been created to prevent water damage caused by water heater leaks. Many such systems and methods have been created to shut off the flow of supply water to a water heater upon the occurrence of a leak. In its most simplistic form, such systems include a receptacle for containing the leaked water and a mechanism for activating shut-off of the water supply. One such system includes a pan placed underneath a hot water heater such that the entire water heater is located within or above the periphery of the pan. The pan is equipped with a float switch designed to generate an electronic shut-off signal whenever the float rises above a predetermined level due to water accumulation in the pan. The generated electronic shut-off signal then actuates solenoid valves located in the water and gas supply lines causing them to close and, thereby, shutting off the water and gas supply to the hot water heater. Also, such systems may optionally include an overflow port or the like connected to a hose for removal of the water from the pan and a programmable message device such as a tape recorder to alert a user that there has been a leak in the system. Other similar systems may include a commercially available alarm in lieu of a programmable message device.

Similarly, other water heater leak protection systems have been created having a platform for the water heater in the center of the pan. The platform elevates the water heater with respect to the pan to prevent damage to the water heater during an overflow situation. In one such system, a float switch and a pump are included within a housing located in the interior of the pan. The base of the housing includes an opening through which water may enter to activate the float switch when a leak occurs. In turn, the float switch simultaneously actuates a shut-off valve attached to the water supply line to shut off the water supply and activates a pump to remove the water from the pan. The water may be pumped through a hose to a sewer or drainage system.

Yet another water heater leak protection system includes a water heater jacket that surrounds at least a portion of the water heater. Upon the occurrence of a water leak, as detected by a moisture sensor located between the water heater tank and water heater jacket, the moisture sensor transmits a disconnect signal to a water heater jacket control system. This disconnect signal prevents the heating element from heating the water contained in the water heater tank. The control system additionally initiates closing of a solenoid valve to prevent supply water from entering the water heater tank.

Another such system having a moisture sensor is designed to detect water leaked by water heater systems, but may also be used to detect leaks in a sink, air conditioning unit, washing machine, or toilet. In some such systems, upon the occurrence of a leak, one or more moisture sensors transmit a wireless signal to a wireless transceiver. The transceiver then transmits a second wireless signal to an alarm or telephone system that alerts the system user that a leak has occurred. The leak detection system may optionally include a shut-off valve that shuts off the water supply to the water-filled device via wireless actuation of the shut-off valve.

BRIEF SUMMARY OF THE INVENTION

Briefly stated, in one aspect of the present invention, a fluid-filled device with an integral fluid detection and containment apparatus is provided. This apparatus includes a fluid-filled device including a water tank and a fluid apparatus mounted internal to the fluid-filled device. The fluid apparatus includes: a base, the base including a canal located between an exterior wall and a centrally-located platform, the canal having a tapered floor such that fluid in contact with the floor is gravitationally directed to a reservoir located in the base; at least one fluid detector having at least one control point, for detecting at least one of the group consisting of a presence of the fluid, a height of the fluid, and combinations thereof for activating the control point upon such detection; at least one water displacement mechanism located in or proximate to the reservoir having at least one control circuit coupled to the control point, the control circuit controlling the water displacement mechanism based upon a status of the control point; and at least one fluid conduit in fluid communication between the reservoir and at least one drainage area; wherein energization of the water displacement mechanism causes the fluid in the reservoir to be discharged from the reservoir through the fluid conduit to the drainage area.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

The fluid apparatus of the present invention may be used in conjunction with any one of a variety of fluid-filled devices including, but not limited to, hot water heaters, air conditioning units, dehumidifiers, humidifiers, water coolers, planters, and aquariums. In one embodiment of the present invention, the fluid apparatus is generic, thereby accommodating use of a single fluid apparatus with any one of a variety of devices. However, alternate embodiments are envisioned in which the dimensions, frame, platform, etc. of the fluid apparatus are configured for use with a specific device and/or the fluid apparatus is configured integral to the specific device. Upon discharge of a fluid from such a device, the fluid apparatus of the present invention contains the fluid within a reservoir and, upon detection of the presence and/or height of such fluid, discharges the fluid via a fluid conduit to one or more predetermined drainage areas, thereby preventing damage to the property or surfaces surrounding the fluid-filled device and fluid apparatus. Since the fluid apparatus of the present invention is not dependent on gravity for drainage, it may be used in any location without the need for a drainage pipe. The fluid apparatus also facilitates testing of such devices, as all fluids discharged during such tests are automatically discarded to a predetermined drainage area or areas.

Figure 1:
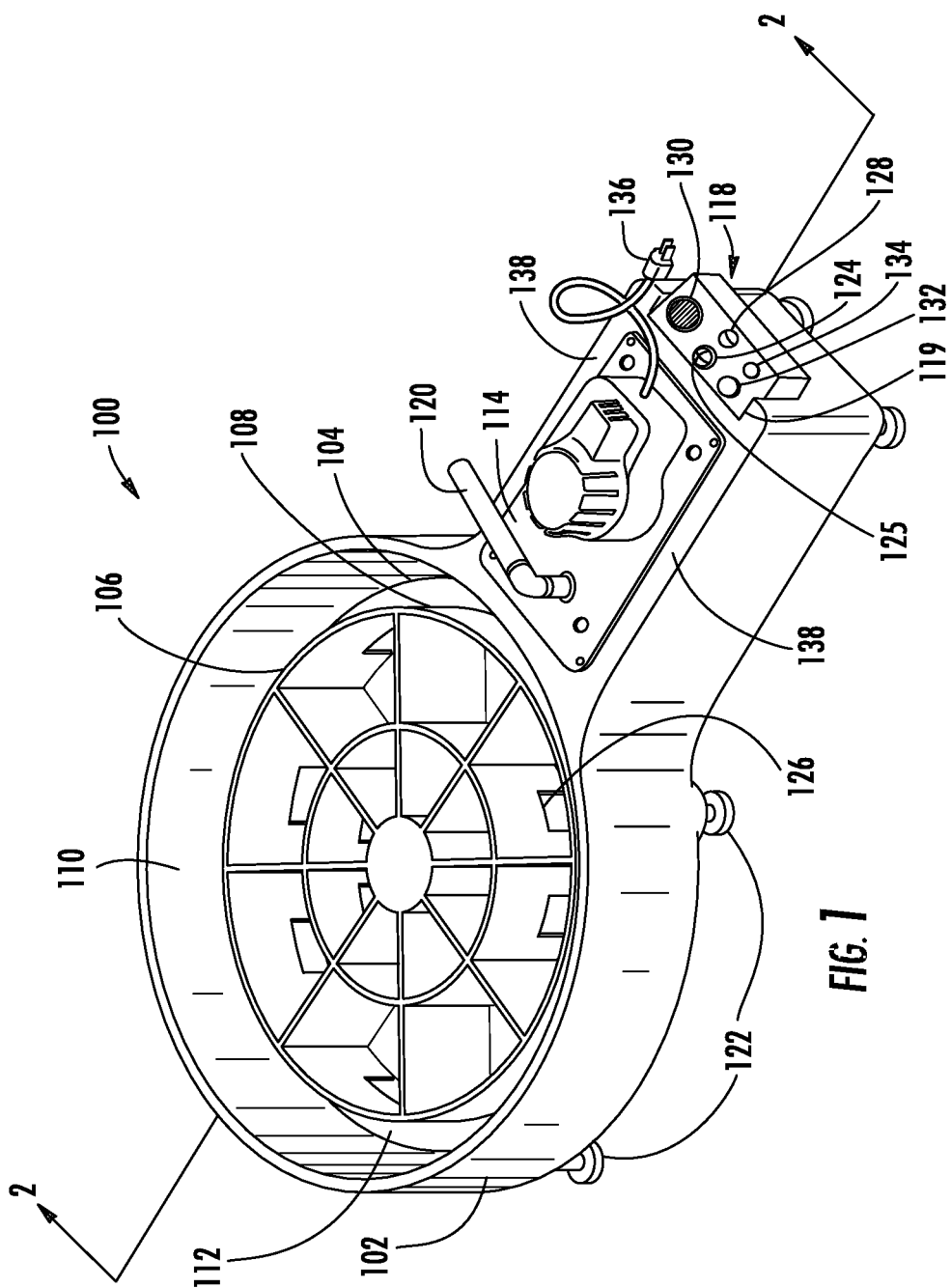
FIG. 1 is a perspective view of a fluid apparatus in accordance with one embodiment of the present invention.

Referring first to FIG. 1, depicted is a perspective view of a fluid apparatus for detecting and containing fluids and/or testing fluid-filled devices in accordance with one embodiment of the present invention. In the depicted embodiment, fluid apparatus 100 includes, inter alia, base 102, reservoir 104, platform 108, exterior wall 110, canal 112, water displacement assembly 114, fluid conduit 120, and, optionally, frame 106, alarm mechanism 118, leveling mechanisms 122, level indicator 124, plug 136, and base platform 138.

Base 102 of fluid apparatus 100 may be manufactured using any durable, load bearing material including, but not limited to, wood products, industrial grade polymers such as fiber reinforced polymers (i.e., polymers reinforced with metal, glass, or other fibers or fillers known in the art). Base 102 may be manufactured as a single unit that includes reservoir 104, platform 108, and exterior walls 110. Furthermore, base 102 may be manufactured to include cavities and/or mounting apertures for accessory components of fluid apparatus 100 such as frame 106, water displacement assembly 114, alarm mechanism 118, leveling mechanisms 122, and level indicator 124.

Creation of base 102 as a single unit having cavities and/or mounting apertures (e.g., alarm mechanism cavity 119, level indicator cavity 125, etc.) for all related accessories creates a portable fluid apparatus 100 that may be easily assembled by an unskilled installer such as a typical homeowner. The preformed cavities and mounting apertures facilitate installation and minimize the quantity and types of tools required to attach accessory components to base 102. In some aspects of the present invention, each cavity and/or mounting aperture may be labeled to eliminate guesswork on the part of the installer. To further facilitate installation, all power required by the unit may be provided via plug 136, which may be a standard electrical plug. That is, to provide power to fluid apparatus 100, an installer simply inserts plug 136 into a standard receptacle. In this manner, no electrician is required for installation of fluid apparatus 100. Power may also be provided by alternative power sources such as a battery, a battery-backup to an electrical plug, an independent generator, or the like.

Use of a moldable material such as a thermosetting or thermoplastic polymer allows base 102 and all components thereof to be manufactured via a simple, less expensive, streamlined process such as injection molding. Fabrication of all components of base 102 via injection molding greatly reduces fabrication time while simultaneously providing more features and options than those available with prior art fluid detection apparatuses requiring longer and/or more expensive fabrication methods. In this manner, the fluid apparatus of the present invention may be produced at a relatively inexpensive cost. In lieu of injection molding, alternate inexpensive methods of manufacturing for base 102 may be substituted including, but not limited to, transfer molding, blow molding, rotational molding, thermoforming, structural foam molding, or compression molding. Or, alternatively, nonplastic materials such as wood and non-molding methods of fabrication may be substituted without departing from the scope of the present invention.

In the embodiment of the present invention depicted in FIG. 1, base 102 is configured or molded in a generally teardrop shape, however, other shapes such as ovate (i.e., egg-shaped), oval, etc. may be substituted without departing from the scope hereof. In this embodiment, the body of the teardrop (i.e., the first section of base 102) is designed to support a fluid-filled device atop frame 106 and/or platform 108. The head of the teardrop (i.e., the second section of base 102) includes a portion of reservoir 104 over which water displacement assembly 114 is mounted, whereas the portion of the head of the teardrop external to reservoir 104 houses alarm mechanism 118 and level indicator 124. The head of the teardrop also includes base platform 138 which may be molded to, or otherwise affixed to, exterior walls 110 of the head of the teardrop. Water displacement assembly 114 is mounted to base platform 138 via screws or the like which may be threaded into preformed apertures in base platform 138. However, alternate embodiments are envisioned in which the locations of these components of fluid apparatus 100 may be varied and/or the method of assembling the components of fluid apparatus 100 may be varied.

As depicted in FIG. 1, base 102 includes leveling mechanisms 122 and level indicator 124. Leveling mechanisms 122 may be leveling legs such as those discussed in greater detail below with respect to FIG. 5 and/or leveling wedges or similar mechanisms that individually alter the height of one or more points of base 102. For example, leveling mechanisms 122 may be four leveling legs, wherein each of the legs is located in one quadrant of the body of fluid apparatus 100. Or, alternatively, leveling mechanisms may be wedges such as rubber wedges, wherein each wedge is inserted under a respective point of base 102 until leveling has been achieved. However, virtually any device capable of adjusting a height of a respective point of base 102 may be substituted without departing from the scope of the present invention.

Leveling mechanisms 122 are individually adjusted as necessary to level base 102 as measured by a level indicator such as level indicator 124. In one embodiment of the present invention, level indicator 124 is a leveling eye mounted within a cavity of base 102 or affixed to base 102 via fasteners and, optionally, pre-fabricated mounting holes within base 102. However, virtually any device capable of indicating level and any method of attachment of level indicator 124 to base 102 may be substituted without departing from the scope of the present invention.

Figure 3:
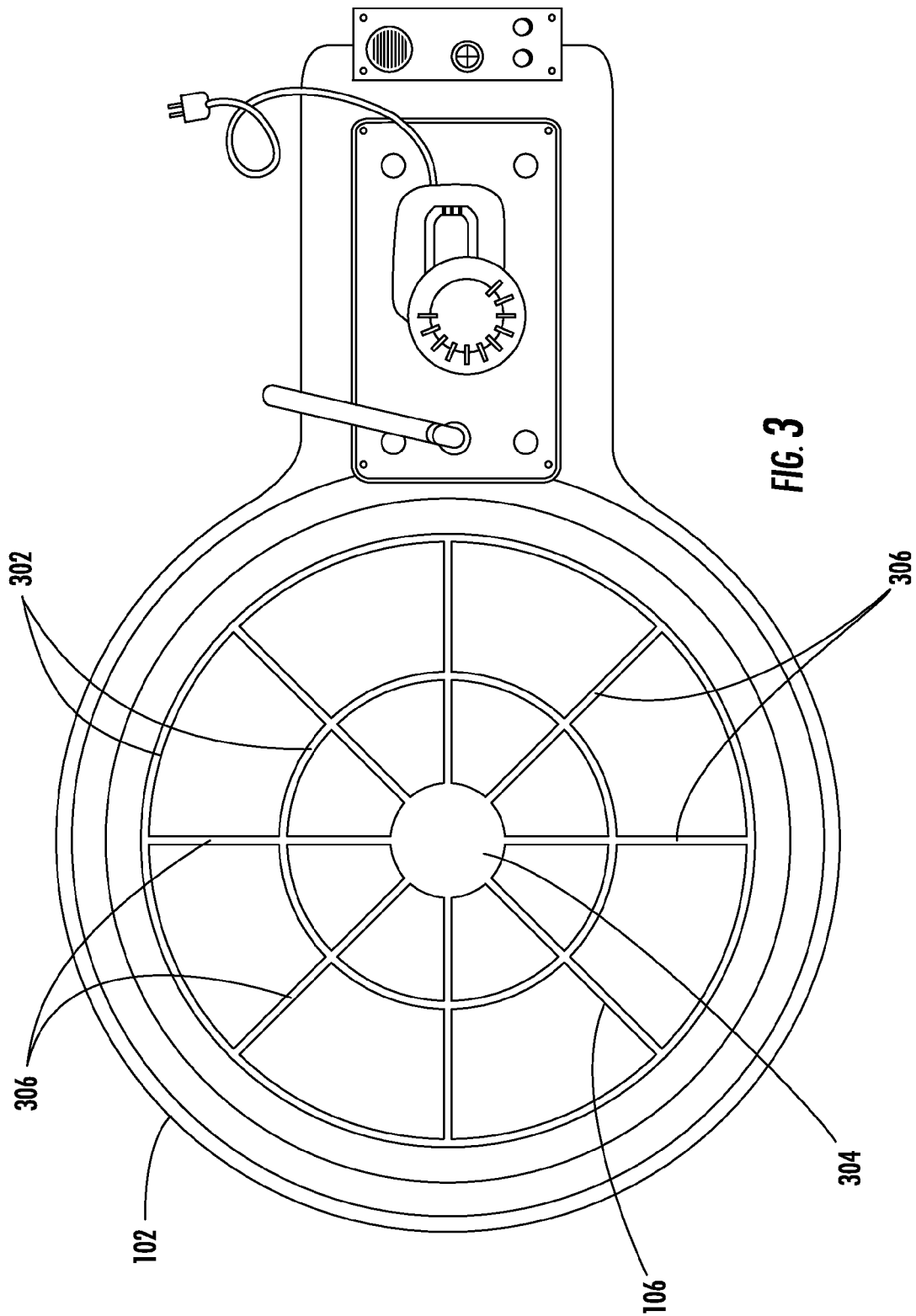
FIG. 3 is a top plan view of a fluid apparatus in accordance with the embodiment of the present invention depicted in FIG. 1.
Figure 6:
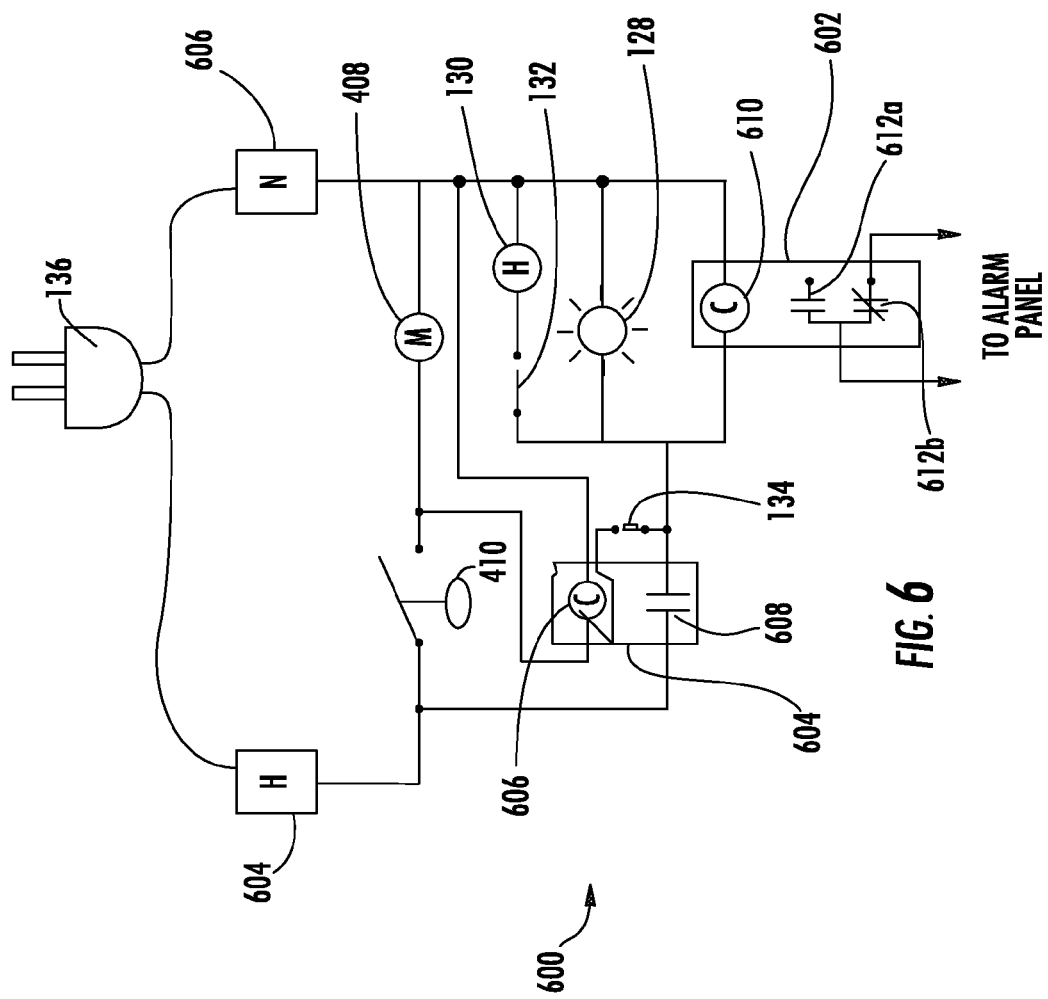
FIG. 6 is a schematic view of one embodiment of the electrical wiring of the embodiment of the present invention depicted in FIG. 1.

Also illustrated in FIG. 1, as well as FIG. 3, is alarm mechanism 118. Also, one exemplary embodiment for wiring alarm mechanism 118 is illustrated in FIG. 6. In the depicted embodiment, alarm mechanism 118 includes lamp 128, horn 130, silence switch 132, and reset 134. Upon detection of fluid by a fluid detector (i.e., a device that detects the presence and/or height of a fluid) such as fluid detector 410 (FIG. 4), a water displacement mechanism such as water displacement mechanism 408 (FIG. 4) is energized and alarm mechanism 118 is activated. Upon activation, lamp 128 illuminates and horn 130 sounds, thereby alerting a user to the presence of fluid within fluid apparatus 100. Also, a signal may be sent to an alarm panel via an alarm panel relay such as alarm panel relay 602 (FIG. 6). Upon recognition of the alarm condition by the user, silence switch 132 may be activated to silence horn 130 until the alarm condition has been remedied; however, lamp 128 remains lit throughout the alarm condition and the signal to the alarm panel remains activated. When the alarm condition no longer exists, a user may depress or otherwise activate reset 134, thereby clearing the alarm and resetting lamp 128, horn 130, and the signal to the alarm panel to their non-alarm conditions. The incorporation of an alarm mechanism such as alarm mechanism 118 eliminates the need for shut off of the water, gas, and/or electric supply since the user is immediately alerted to the alarm condition. However, water, gas, or electric supply shutoff may be added to the present invention without departing from the scope of thereof.

Figure 2:
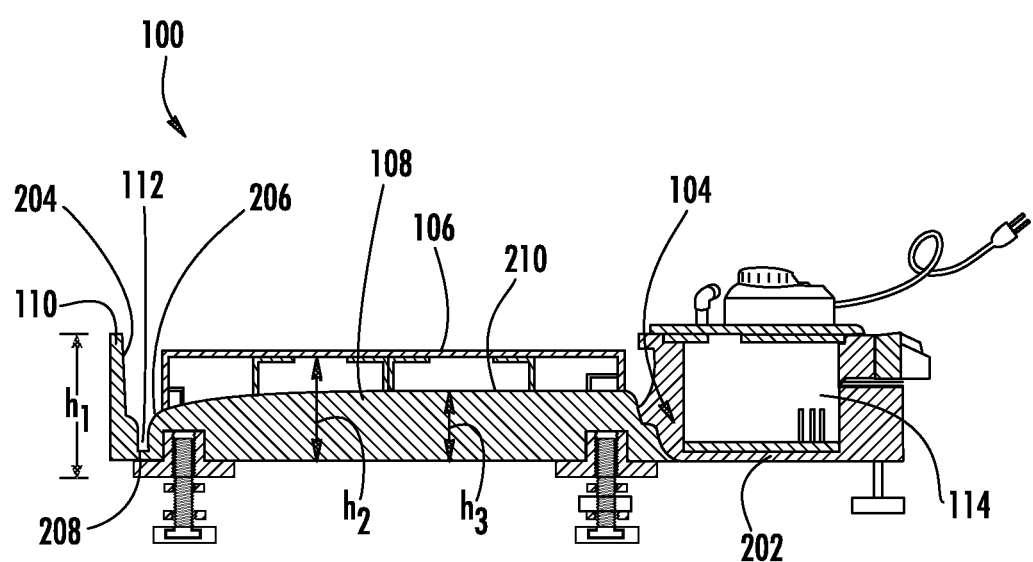
FIG. 2 is a cross-sectional side view taken along line 2-2 of FIG. 1 illustrating the configuration of the canal, reservoir, and water displacement assembly relative to the frame and platform in accordance with the embodiment of the present invention depicted in FIG. 1.

Referring now to FIG. 2, the height $h_1$ of exterior wall 110 is designed such that it exceeds the height $h_2$ of frame 106 and, therefore, the height $h_3$ of platform 108 upon which frame 106 is located. The raised height of exterior wall 110 prevents or minimizes flow of fluid leaked from the fluid-filled device over the top of exterior wall 110. Similarly, platform 108 is designed such that platform upwardly facing surface 210 is at a lower height than that of exterior wall 110 to prevent or minimize fluid leaked atop platform 108 from overflowing exterior walls 110.

Additionally, in some aspects of the present invention such as that depicted in FIG. 2, exterior wall inwardly facing surface 204 is tapered such that fluid in contact with such surface is directed toward canal 112. Similarly, platform outwardly facing surfaces 206 may also be tapered such that any fluids in contact therewith are also directed away from the base of the fluid-filled device toward canal 112. Furthermore, platform upwardly facing surface 210 may be convex such that any fluid leak atop platform 108 is more quickly discharged to canal 112. However, alternate embodiments are envisioned in which upwardly facing surface 210 is generally flat or otherwise shaped to maximize support of the fluid-filled device.

To further maximize drainage within fluid apparatus 100, the canal floor 208 and reservoir floor 202 may be optionally tapered such that each has a diminishing height along all paths leading from base end 203 of the first section of base 102 to water displacement assembly 114. That is, in the depicted embodiment, water displacement assembly 114 is located directly above the lowest point within reservoir 104 (i.e., the sump) such that any fluid deposited within fluid apparatus 100 is gravitationally directed toward water displacement assembly 114 to maximize fluid detection and drainage. However, other embodiments of the present invention are envisioned in which the canal and/or reservoir floors are generally flat or otherwise untapered.

In some embodiments of the present invention, frame 106 is utilized. Frame 106 may provide further support for the load of the fluid-filled device. Or, frame 106 may simply raise the height of the bottommost surface of the fluid-filled device to minimize the possibility of damage thereto. In one aspect of the present invention, frame 106 is manufactured from metal (e.g., steel) or a similar material and rests atop platform 108, the latter of which may be molded as an integral component of base 102. In addition, frame 106 may be manufactured to include drainage apertures such as frame apertures 126 (FIG. 1) to allow fluid leaked within frame 108 to drain to reservoir 104. Alternatively, frame 106 may be molded from the same material and as an integral part of base 102. In yet another embodiment, frame 106 is a separate and distinct component from base 102 that is set within a molded cavity of base 102 sized to accept frame 106. In yet another embodiment, frame 106 is omitted and the fluid-filled device rests directly atop platform 108. In such an embodiment, platform 108 may include one or more reinforcements (e.g., thicker molded sections, metallic or wood inserts, etc.) in areas having direct contact with the fluid-filled device. Many variations of frames and frame configurations may be substituted without departing from the scope of the present invention.

The generic design of frame 106 and platform 108 allow a single fluid apparatus 100 to accommodate any one of a variety of fluid-filled devices of varying external dimensions including, but not limited to, hot water heaters, air conditioning units, dehumidifiers, humidifiers, water coolers, planters, and aquariums. In addition to allowing a single fluid apparatus to be used with any one of a variety of devices, this generic design allows a first fluid-filled device such as a hot water heater to be replaced (e.g., upon failure, at the end of its useful life, etc.) with a second hot water heater having a different external dimension. That is, the second hot water heater may be of a different manufacturer or model, but will still be compatible with fluid apparatus 100. This aspect of the present invention minimizes the cost of retaining a fluid apparatus for the new fluid-filled device, especially in situations in which the fluid-filled device cannot be replaced with an exact duplicate (e.g., the manufacturer has gone out of business, the model is no longer manufactured, etc.).

Turning now to FIG. 3, depicted is a top view of fluid apparatus 100 in accordance with the embodiment of the present invention depicted in FIG. 1. As discussed above, the fluid-filled device rests atop frame 106, which in turn rests atop or is molded integral to platform 108 (FIG. 1). In one embodiment of the present invention, frame 106 includes circular supporting members 302, central supporting member 304, and radial supporting members 306. Central supporting member 304 may extend partially or completely throughout the height of base 102, or may simply rest atop base 102. Radial supporting members 306 are coupled to the topmost end of central supporting member 304 and extend radially therefrom. One or more circular supporting members 302 are coupled to points of radial supporting members 306 located at equivalent distances from central supporting member 304. Such a configuration provides structural support for the load associated with the fluid-filled apparatus.

Also depicted in FIG. 3 is a top view of water displacement assembly 114. Water displacement assembly 114 is suspended directly above reservoir 104 (FIG. 1) and may be virtually any commercially available water displacement mechanism or water displacement assembly of minimal size such that water displacement assembly 114 is capable of mounting to base 102 and is capable of discharging fluid from a reservoir such as reservoir 104. In one embodiment of the present invention, a commercially available condensate removal pump such as that manufactured by Beckett Corporation having model number CB151UL is implemented. However, other similar water displacement mechanisms or water displacement assemblies (e.g., bilge pumps, sump pumps, etc.) may be substituted without departing from the scope hereof.

Figure 4:
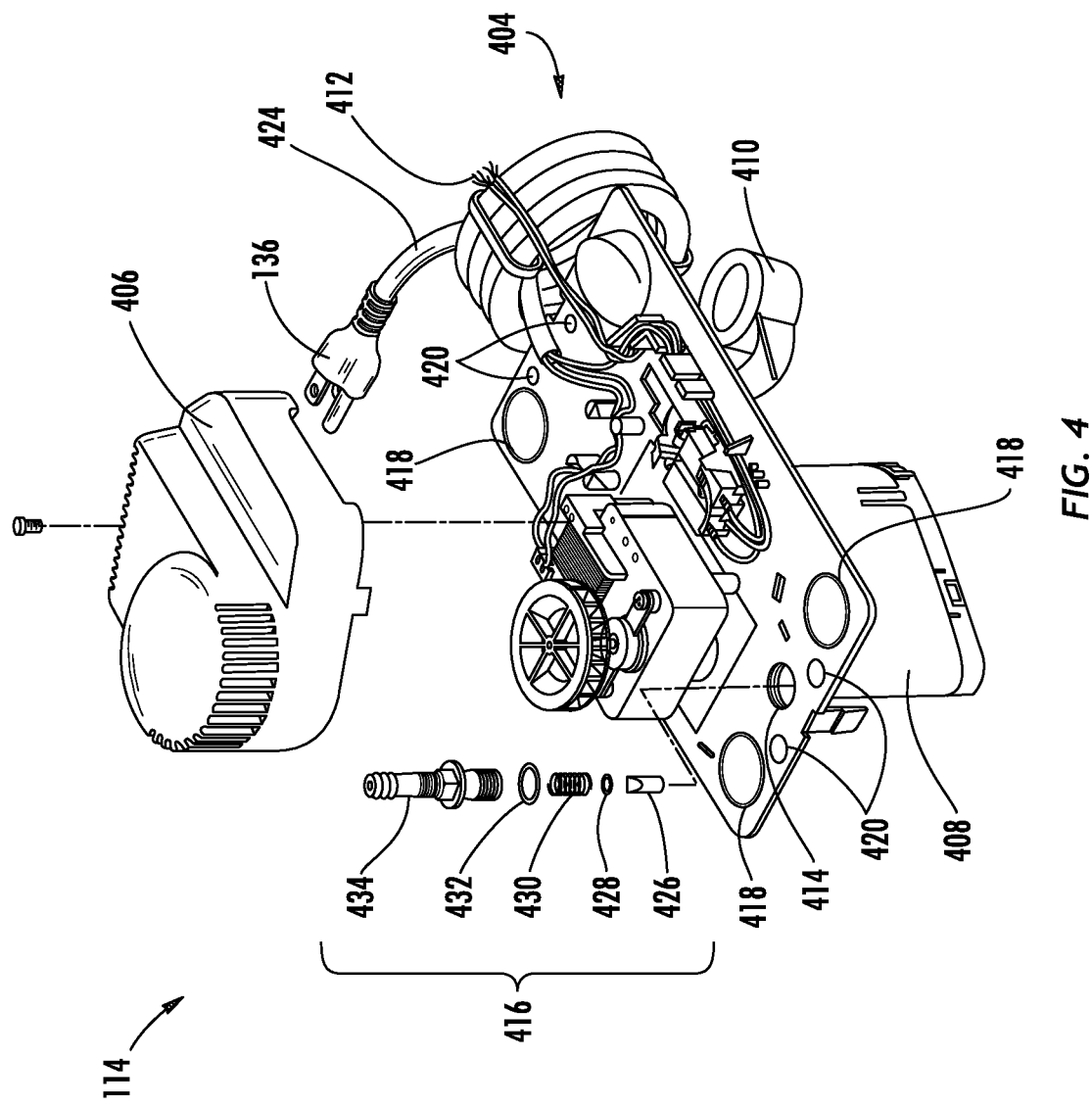
FIG. 4 is an exploded view of a water displacement assembly in accordance with the embodiment of the present invention depicted in FIG. 1.

Referring now to FIG. 4, depicted is an exploded view of water displacement assembly 114 in accordance with one embodiment of the present invention. Water displacement assembly 114 includes, inter alia, subassembly 404 and covering 406, wherein subassembly 404 includes, inter alia, plug 136, water displacement mechanism 408, fluid detector 410, alarm mechanism wiring 412, discharge aperture 414, discharge aperture assembly 416, and one or more intake apertures 418. In the embodiment of the present invention depicted in FIG. 4, water displacement assembly apertures 420 have been cut into subassembly 404 to allow water displacement assembly 114 to be mounted atop base platform 138 (FIG. 1) such that it is suspended at least partially above reservoir 104 (FIGS. 1 and 2).

In one aspect of the present invention, base platform 138 (FIG. 1) is manufactured with base platform apertures or the like to facilitate mounting of water displacement assembly 114 or one of its components. For example, base platform apertures may be located within base platform 138 such that they align with water displacement assembly apertures (e.g., an aperture passing through a flange located along the perimeter of the water displacement assembly) such as water displacement assembly apertures 420. Such location allows water displacement assembly 114, or components thereof, to be easily attached by placing such components in the desired location adjacent base platform 138 (FIG. 1), aligning water displacement assembly aperture 420 with the base platform aperture, and passing one or more fasteners through water displacement assembly aperture 420 into the base platform aperture. Incorporation of base platform apertures also facilitates removal and replacement of water displacement assembly 114, which may be required upon failure of water displacement assembly 114 or to facilitate cleaning or other maintenance of water displacement assembly 114, base 102 (FIG. 1), and reservoir 104 (FIG. 1).

Water displacement assembly 404 is affixed atop base platform 138 via any suitable fastener such as snaps, screws, or the like. Power is provided to water displacement assembly 404 via plug 136 and cord 424. As discussed above, plug 136 is a standard plug compatible with standard receptacles (e.g., in the United States, a 110-volt receptacle). Upon a rise in the level of the fluid within reservoir 404, fluid detector 410 activates a control point (e.g., a contact, switch, etc.) as depicted in FIG. 6. Such control point is electrically coupled to a control circuit such as control circuit 600 (FIG. 6) that activates water displacement mechanism 408. Upon activation of the control point, water displacement mechanism 408 is energized, and upon de-activation of the control point, water displacement mechanism 408 is de-energized. However, alternate embodiments are envisioned in which water displacement mechanism 408 is energized upon de-activation of the control point and is energized upon activation of the control point. Fluid detector 410 may be a float detector, level detector, or the like. This control point is also wired to a control circuit such as control circuit 600 (FIG. 6) via alarm mechanism wiring 412 or the like as discussed in greater detail below with respect to FIG. 6.

In some aspects of the present invention, water displacement assembly 114 includes a discharge port or the like for attachment of a fluid conduit such as fluid conduit 120 (FIG. 1). In the embodiment of the present invention depicted in FIG. 4, the discharge port includes discharge aperture 414 and discharge aperture assembly 416. In one aspect of the present invention, discharge aperture assembly 416 includes duckbill valve 426, washer 428, spring 430, o-ring 432, and barbed fitting 434 assembled as depicted in FIG. 4. In this embodiment, a fluid conduit is simply passed over the uppermost end of barbed fitting 434 and may be further secured thereto via a hose clamp or the like. However, other methods, assemblies, and mechanisms may be substituted for attachment of a fluid conduit to water displacement assembly 114 without departing from the scope of the present invention. For example, water displacement assembly 114 may include multiple discharge ports and corresponding fluid conduits to provide one or more backup discharge sources to accommodate clogging or blockage of the primary fluid conduit.

Fluid conduit 120 (FIG. 1) may be a conventional hose, tube, or similar apparatus for directing flow from reservoir 104 (FIG. 1) and/or water displacement assembly 114 to a predetermined drainage area (or areas if desired and/or if multiple fluid conduits are installed) including, but not limited to, a sink, drain, a home sewage drain, French drain, well, basement sump drain, water system outlet, and an outside environment. Attachment of fluid conduit 120 (FIG. 1) to water displacement assembly 114, extension of fluid conduit 120 (FIG. 1) to the desired drainage area, and attachment of fluid conduit 120 (FIG. 1) to the drainage area, if required, is the extent of the "plumbing" required to install the fluid apparatus of the present invention. Therefore, such work may be easily performed by an unskilled homeowner without the need for hiring a professional plumber. Since neither a plumber nor an electrician is required for installation of fluid apparatus 100 (FIG. 1), fluid apparatus 100 (FIG. 1) may be easily installed by an unskilled homeowner. Furthermore, the ease of installation as well as the portability of fluid apparatus 100 (FIG. 1) allows it to be easily relocated and/or reinstalled by an unskilled homeowner during construction, remodeling projects, or relocation to a new residence.

Alternate embodiments of the present invention are envisioned in which the fluid detector is a separate and distinct component. Such a fluid detector may be virtually any commercially available fluid detector of minimal size such that it fits within base 102 (FIG. 1) and is capable of detecting fluid in a reservoir such as reservoir 104 (FIG. 1). In one embodiment of the present invention, a commercially available water detector having an adjustable height is implemented. Use of such a device allows the user to control energization of the water displacement mechanism relative to the height of the fluid level contained in reservoir 104 (FIG. 1). Such control may be desired to minimize water displacement mechanism energy (i.e., by adjusting the fluid detector to activate at a high fluid level) or to minimize the response time of fluid apparatus 100 (FIG. 1) (i.e., by adjusting the fluid detector to activate at a low fluid level). However, other similar fluid detectors (e.g., float switches, fluid detection tape, fluid detection cabling, nonadjustable fluid detectors, etc.) with adjustable or nonadjustable heights may be substituted without departing from the scope hereof.

In embodiments of the present invention having fluid detectors that are distinct from the water displacement mechanism or water displacement assembly, base 102 (FIG. 1) may be manufactured with apertures or the like to facilitate mounting of the fluid detector. For example, these apertures may be located within base 102 (FIG. 1) such that they align with the fluid detector apertures (e.g., apertures passing through a flange located along the perimeter of the fluid detector). Such location allows the fluid detector to be easily attached by placing the fluid detector in the desired location atop base 102 (FIG. 1), aligning the fluid detector apertures with base apertures, and passing one or more fasteners through the fluid detector apertures into the base apertures. Incorporation of base apertures also facilitates removal and replacement of the fluid detector, which may be required upon failure of the fluid detector or to facilitate cleaning or other maintenance of the fluid detector, base, and/or reservoir.

In addition to detecting and containing fluids, fluid apparatus 100 (FIG. 1) also facilitates testing and maintenance of fluid apparatus 100 (FIG. 1) as well as of the fluid-filled devices. For example, fluid-filled devices such as hot water heaters perform more efficiently when sediment is regularly drained from the fluid-filled device via a hose bib, T&P valve (i.e., a temperature and pressure valve), or the like. Such maintenance is facilitated by the present invention, which allows a fluid conduit such as a hose to be attached at a first end to the hose bib while a second end is inserted through an intake aperture such as intake aperture 418. The hose may be a flexible hose that is heat resistant (and therefore accommodates passage of steam) or the like. Such hose may be clamped to water displacement assembly 114 to prevent accidental removal of the hose therefrom. Once the hose has been properly positioned, the valve associated with the hose bib may be opened to drain the sediment. All fluids released from the fluid-filled device during this process will gather in reservoir 104 (FIG. 1) and activate the fluid detector, which will then energize the water displacement mechanism and discard all gathered fluid and sediment to a predetermined drainage area via a fluid conduit. In the embodiment of the present invention depicted in FIG. 4, the configuration of water displacement assembly 114 prevents the discharged fluid from splashing beyond the confines of reservoir 104 (FIG. 1).

Using a similar procedure, the fluid apparatus may be tested for proper operation. That is, reservoir 104 (FIG. 1) may be filled with a fluid via a fluid conduit coupled to the hose bib, T&P valve, or the like to ensure that the fluid detector detects the fluid upon reaching the required fluid level. Furthermore, the energization of the water displacement mechanism and activation of an alarm mechanism by the fluid detector may also be tested. Such testing procedures may be easily performed without cleanup due to the automatic discard of the fluid to the predetermined drainage area via the fluid conduit.

The present invention may be installed using a minimal quantity of steps. First, the fluid apparatus is placed in the desired location. Second, the fluid-filled device is placed atop the fluid apparatus. Third, a first end of a fluid conduit is affixed to a discharge port of the fluid apparatus and is extended to a desired drainage area or areas. Optionally, the fluid conduit may be affixed to the drainage area using a hose clamp or the like. Fourth, and finally, the plug of the fluid apparatus is inserted into a standard receptacle. Using these simple steps, the apparatus of the present invention minimizes installation time and eliminates the need for a professional plumber and electrician. However, other steps may be optionally added to this method of installation without departing from the scope of the present invention.

Figure 5:
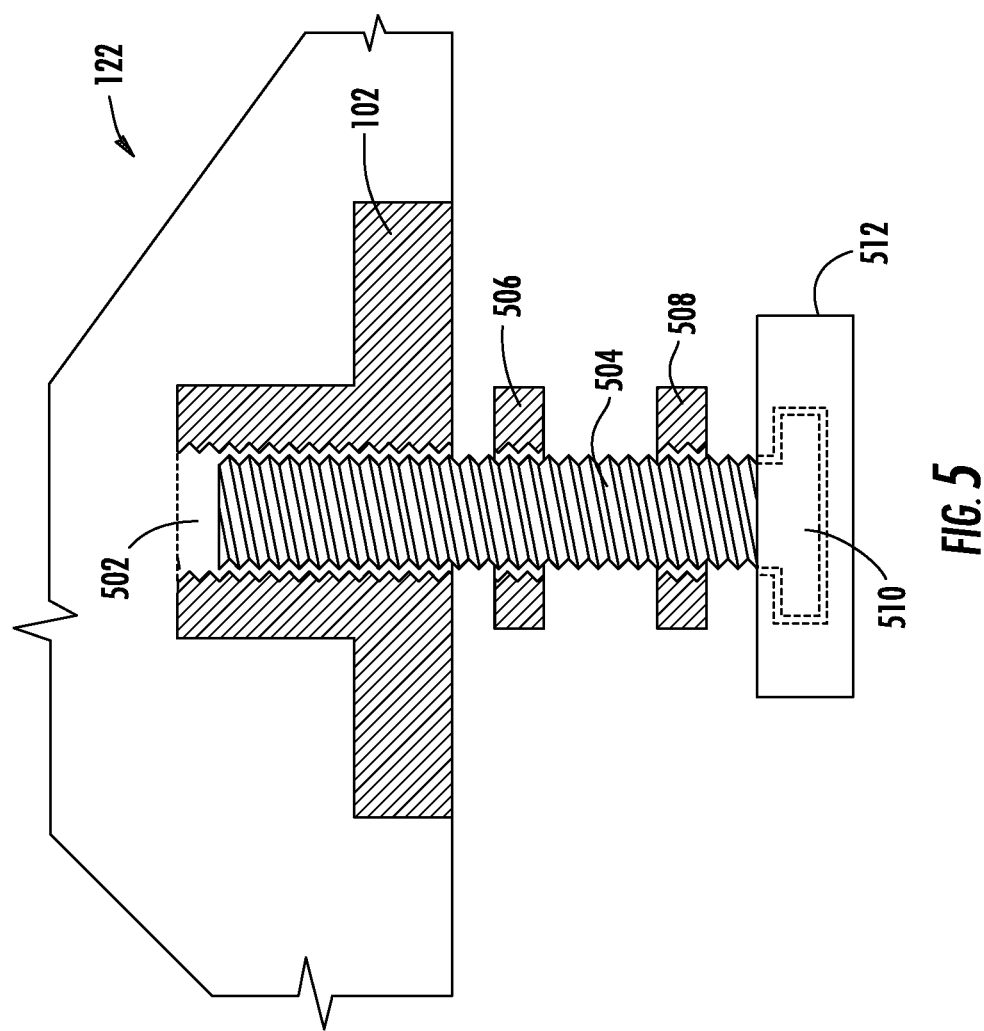
FIG. 5 is an enlarged view of a leveling mechanism in accordance with the embodiment of the present invention depicted in FIG. 1.

Turning next to FIG. 5, depicted is one embodiment of a leveling mechanism in accordance with the present invention. In the depicted embodiment, base 102 includes threaded leveling mechanism apertures 502. To adjust the height of leveling mechanism 122, fastener 506 (e.g., a lock nut) is threaded downwardly with respect to bolt 504 such that bolt 504 may be threaded upwardly or downwardly as desired by a user. Such threading may be performed via application and rotation of a tool (e.g., a hex wrench) to leveling mechanism interface 508, which is permanently affixed to bolt 504. As bolt 504 is rotated upwardly or downwardly, bolt head 510 rotates within leveling mechanism base 512. Although FIG. 5 depicts one embodiment of a leveling mechanism, virtually any type of leveling mechanism capable of raising and lowering a point of base 102 (FIG. 1) may be substituted without departing from the scope of the present invention.

Turning now to FIG. 6, depicted is an exemplary electrical schematic for alarm mechanism 118 (FIG. 1). As discussed above, plug 136 is compatible with a standard electrical outlet and, when inserted into such an outlet, plug 136 provides power (i.e., hot and neutral connections 604 and 606, respectively) to control circuit 600. When a liquid is sensed by fluid detector 410, an internal switch activates (i.e., such switch closes as depicted in control circuit 600) providing power to water displacement mechanism 408 and reset relay coil 606 of reset relay 604. Reset relay contact 608 then closes, thereby locking relay 604 in an energized state and providing power to lamp 128, horn 130, and alarm panel relay 602. Consequently, lamp 128 is illuminated and horn 130 sounds unless and until a user depresses silence switch 132, the latter of which will de-energize horn 130. Alarm panel relay coil 610 is also energized causing normally open alarm panel relay contact 612a and normally closed alarm panel relay contact 612b to change state (i.e., from open to closed and from closed to open, respectively). Either or both of alarm panel relay contacts 612 may be wired to an alarm panel. The change of state of alarm panel relay contact 612 notifies the alarm panel or the like that an alarm has occurred, thereby prompting it to generate a predetermined alarm response (e.g., notifying the fire department, notifying the homeowner, etc.) using methods known in the art. It should be noted that control circuit 600 is one of a large quantity of control circuits that may be implemented in accordance with the systems of the present invention without departing from the scope thereof.

Figure 7:
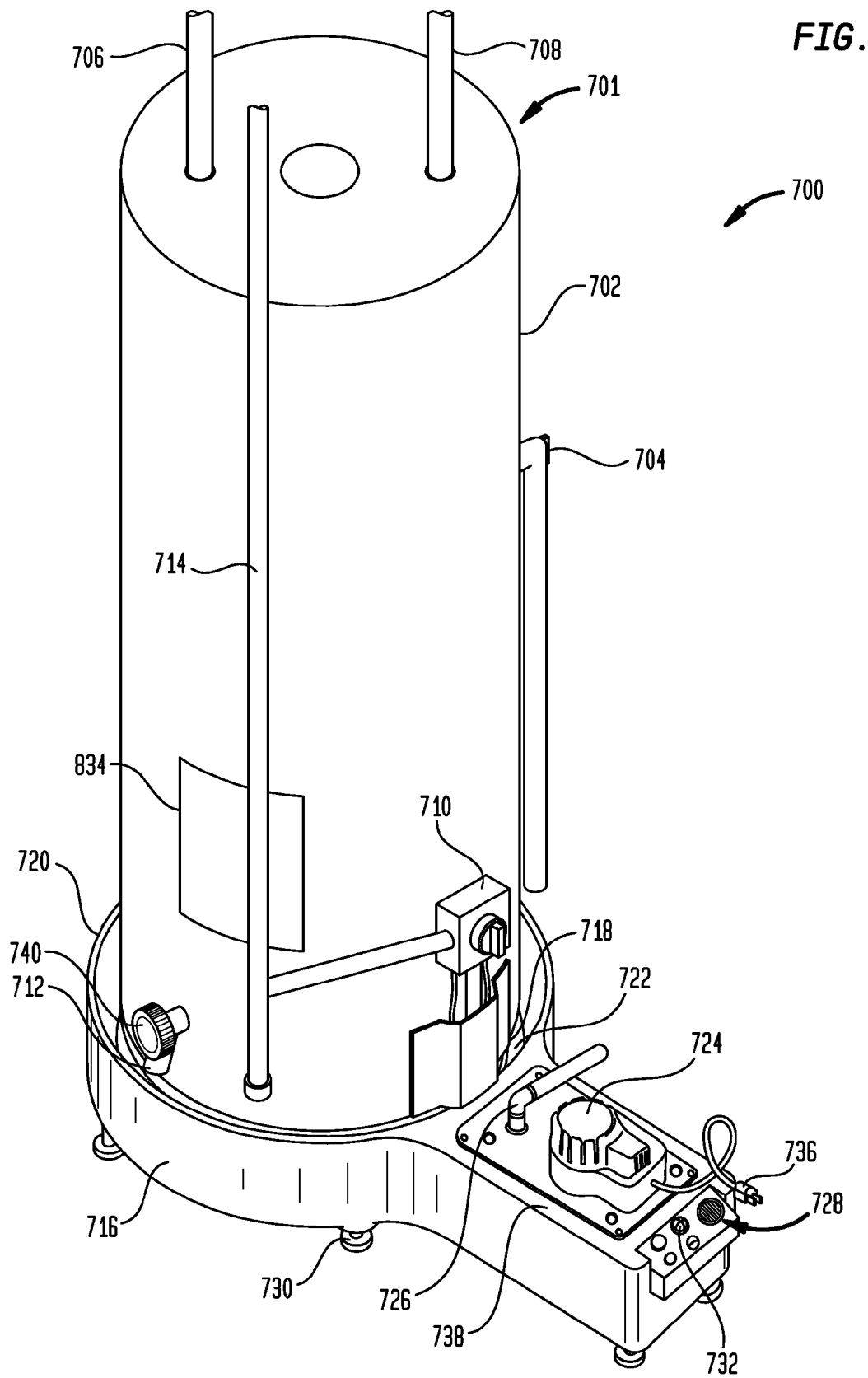
FIG. 7 is a perspective view of a water heater with an integral fluid detection and containment apparatus in accordance with one embodiment of the present invention.

Turning now to FIG. 7, depicted is a perspective view of water heater assembly 700 in accordance with an alternate embodiment of the present invention in which the fluid detection and containment apparatus is integral to the fluid-filled device. Water heater assembly 700 includes water heater 701 and integral fluid apparatus 716. Water heater 701 includes, inter alia, body 702, valve 704, water inlet 706, water outlet 708, thermostat 710, drain 712, gas supply inlet 714, and fluid apparatus 716. In this embodiment, fluid apparatus 716 is coupled to water heater 701 during the manufacturing process or otherwise prior to sale to the consumer. This allows the user to purchase water heater 701 together with fluid apparatus 716, thereby eliminating the need for the user to install fluid apparatus 716.

In the depicted embodiment, water heater 701 warms water to a desired temperature via any one of a variety of methods commonly known in the art. Relatively cold water is supplied to the device via water inlet 706. The water is heated via the internal components of water heater 701 via any one of a variety of methods commonly known in the art. The desired temperature is set by the user via thermostat 710. After water enters the water heater via water inlet 706, it is typically contained in the upper portion of body 702. Also, typically, the lower portion of body 702 contains the heating apparatus of water heater 701. Power to heat the water may be supplied to water heater 701 via any one of a variety of methods commonly known in the art. In the depicted embodiment, water heater 701 receives a supply of natural gas via gas inlet 714, which is combusted to heat the water via any one of a variety of methods commonly known in the art. However, embodiments of the present invention are envisioned in which other power sources are substituted including, without limitation, electric power. The hot water exits the heater via water outlet 708. During the heating process, if the internal temperature or pressure of the water heater becomes too great, the excess pressure is relieved via a temperature and pressure relief valve such as valve 704. Additionally, if the user desires to remove water from water heater 701, this can be accomplished via rotating handle 740, which allows the water to exit water heater 701 via drain 712.

Figure 8:
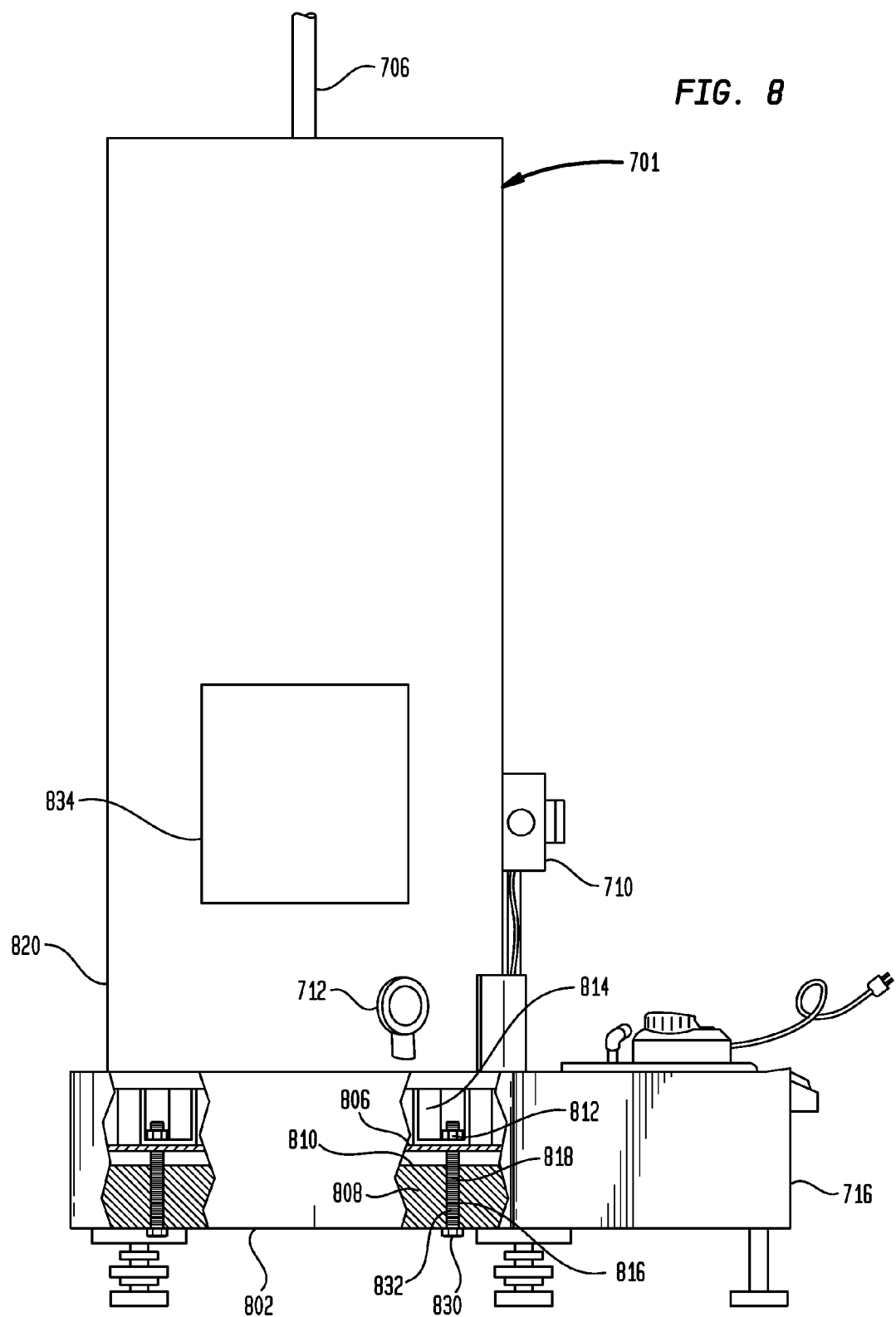
FIG. 8 is a side elevational view of the water heater with integral fluid detection and containment apparatus of FIG. 7 with cutaway views of two fasteners.

Referring now to FIGS. 7 and 8, fluid apparatus 716 includes base 802, which is substantially identical to base 102 of fluid apparatus 100 as described in detail above with the exception that base 802 includes an attachment mechanism for attaching fluid apparatus 716 to water heater 701 as described in greater detail below. That is, reservoir 718, platform 808, exterior wall 720, canal 722, water displacement assembly 724, fluid conduit 726, frame 806, alarm mechanism 728, leveling mechanisms 730, level indicator 732, plug 736, and base platform 738 are substantially identical to reservoir 104, platform 108, exterior wall 110, canal 112, water displacement assembly 114, fluid conduit 120, frame 106, alarm mechanism 118, leveling mechanisms 122, level indicator 124, plug 136, and base platform 138, respectively, other than the exceptions discussed in greater detail below.

Figure 10:
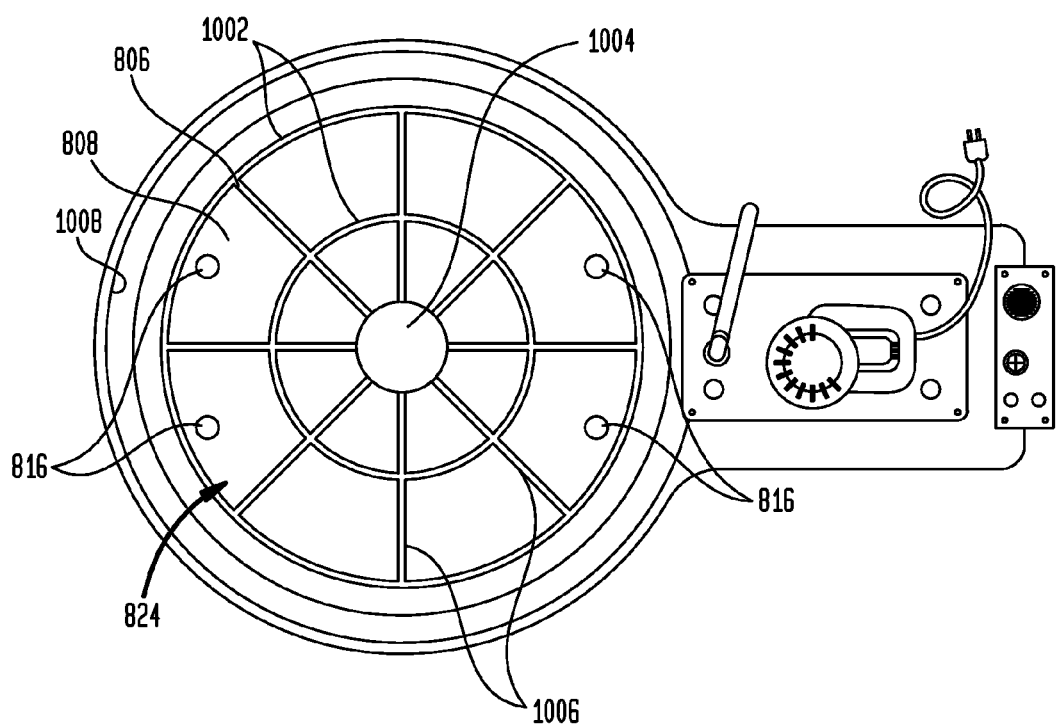
FIG. 10 is a top view of the integral fluid detection and containment apparatus of FIG. 7 prior to attachment of same to the water heater of FIG. 7.

Base 802 is substantially identical to base 102 (as depicted and discussed in greater detail above with respect to FIG. 2) except that base 802 includes a plurality of substantially cylindrical, substantially vertical channels 816 as best seen in FIGS. 8 and 10. That is, each channel extends through the downwardly facing surface of base 802 in a substantially cylindrical and vertical manner, also passing through base 802 and/or platform 808 as well as platform upwardly facing surface 810. The diameter of channel 816 may vary and it is selected to allow a fastener of sufficient strength to attach fluid apparatus 716 to water heater 701 (e.g., fastener 818) to pass therethrough. If such fastener is a bolt, as is the case in the depicted embodiment, the diameter of channel 816 should be of sufficient size to allow the shaft of the bolt to pass therethrough, yet small enough to prevent the head of the bolt from entering same.

In some embodiments of the present invention including the depicted embodiment, a frame such as frame 806 may be optionally included in water heater assembly 700. Frame 806 includes circular supporting members 1002, central supporting member 1004, and radial supporting members 1006, which are substantially identical to circular supporting members 302, central supporting member 304, and radial supporting members 306, respectively, as discussed above with respect to FIG. 3. A plurality of openings 824 exist between central supporting members 1004 and radial supporting members 1006. As best seen in FIG. 10, the four channels 816 align with openings 824 such that a fastener passes through platform 808 and opening 824 prior to entering aperture 904 as discussed in greater detail below. That is, since openings 824 align with the substantially vertical path of channels 816, fasteners inserted into channels 816 may pass easily through openings 824. However, in alternate embodiments in which one or more members of frame 806 (e.g., such as central supporting members 1004 and radial supporting members 1006) obstruct the substantially vertical path of one or more channels 816, bores must be made therein in alignment with such channels to allow the fastener to pass therethrough.

In order to maximize the water captured by fluid apparatus 716, an approximately one (1) inch gap between outwardly facing surface 820 of water heater 700 and exterior wall inwardly facing surface 1008 of fluid apparatus 716 is provided. Exterior wall inwardly facing surface 1008 is substantially identical to exterior wall inwardly facing surface 204 as described in greater detail above. In the depicted embodiment, the components of base 802 are sized based upon the exterior dimensions of the water heater 701 to which it will be coupled to maintain an approximately one (1) inch distance between outwardly facing surface 820 and exterior wall inwardly facing surface 1008 around the entire perimeter of water heater 701. To accommodate this, the diameter between opposing sides of exterior wall inwardly facing surface 1008 is approximately two (2) inches greater than the diameter of body 702 of water heater 701. The approximately one (1) inch gap provides sufficient clearance to allow water traveling downwards along outwardly facing surface 820 of water heater 701 to flow into base 802 without splashing onto the surroundings. However, gaps greater or less than one (1) inch may be substituted without departing from the scope of the present invention.

As best seen in FIG. 10, the depicted embodiment of the present invention includes four (4) channels 816, however, alternate quantities may be substituted without departing from the present invention. Also, in the depicted embodiment of the present invention, two pairs of channels 816 are located on either side of the longitudinal axis of symmetry of base 802 at a distance of approximately one-eight of the width of base 802 from such axis of symmetry. These locations of channels 816 provide evenly balanced support and attachment of water heater 701. These locations are also situated to align with apertures 904 in feet 814 of water heater 701 when it is set atop base 802, as discussed in further detail below. However, alternate quantities and locations of channels 816 and apertures 904 may be substituted without departing from the scope of the present invention.

Figure 9:
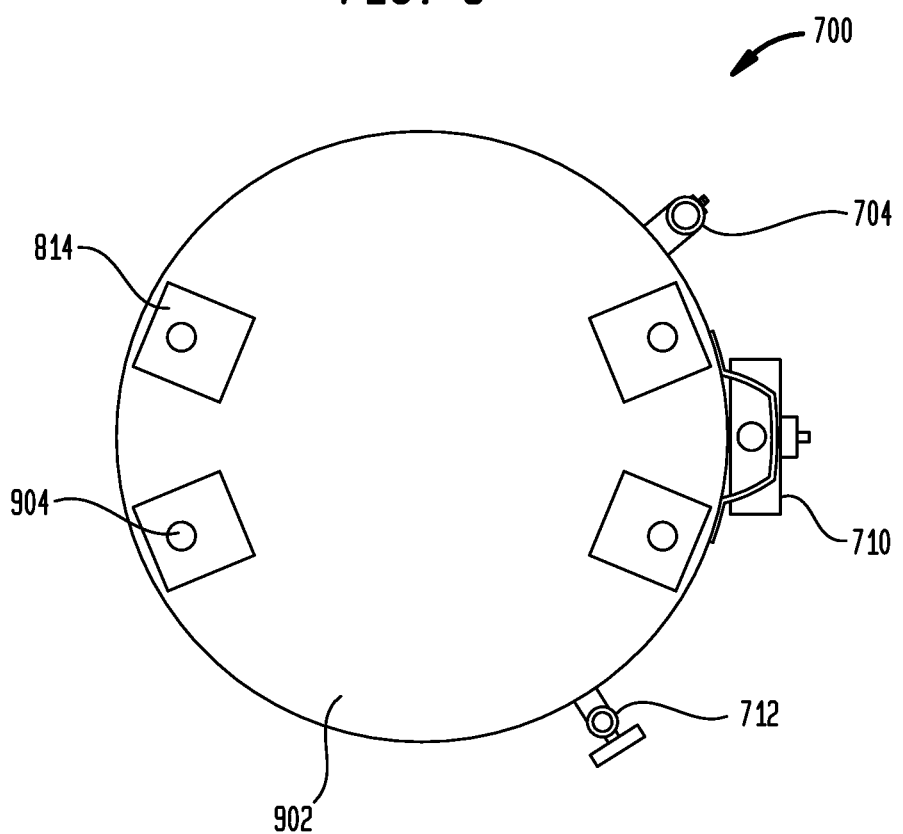
FIG. 9 is a bottom view of the water heater of FIG. 7 prior to attachment of the integral fluid detection and containment apparatus.

Now referring to FIGS. 8 and 9, a plurality of feet 814 are attached to the bottommost surface 902 of water heater 701. Feet 814 may be attached to bottommost surface 902 via welding, bolting, or any other method as is typically known in the art. In the depicted embodiment of the present invention, a substantially circular aperture 904 is created in one or more feet 814 to facilitate attachment of fluid apparatus 716 to water heater 701 via a fastener such as fastener 818. The diameter of aperture 904 may vary and it is selected to allow a fastener of sufficient strength to attach fluid apparatus 716 to water heater 701 (e.g., fastener 818) to pass therethrough as discussed in greater detail below. If such fastener is a bolt, as is the case in the depicted embodiment, the diameter of channel 816 should be of sufficient size to allow the shaft of the bolt to pass therethrough, yet small enough to prevent the head of the bolt from entering same. Although the depicted embodiment of the present invention includes apertures located in the feet of a water heater, apertures may be located in areas of the water heater other than the feet and/or other mechanisms for attaching a fastener may be substituted including, without limitation, rings, tabs, and the like.

Referring back to FIG. 8, depicted is a cutaway view of the attachment of fluid apparatus 716 to water heater 701 via a plurality of fasteners 818. In the depicted embodiment of the present invention, the shaft of the respective fastener 818 is passed through its respective channel 816 and aperture 904 until head 830 abuts the downwardly facing surface of fluid apparatus 716. Thereafter, coupler 812 is firmly affixed to fastener 818 to hold fluid apparatus 716 tightly against the fluid filled apparatus. In the depicted embodiment, fastener 818 is a screw and coupler 812 is a bolt that is threaded onto the end of shaft 832 of bolt 718 to tightly secure fluid apparatus 716 to the fluid filled apparatus. However, alternate fasteners and couplers may be substituted without departing from the scope of the present invention. Additionally, in the depicted embodiment, four (4) fasteners and associated couplers are utilized to couple fluid apparatus 716 to water heater 701. However, varying quantities may be substituted without departing from the scope of the present invention. In this manner, integral fluid apparatus 716 may be attached to a fluid-filled device prior to sale to a consumer (e.g., as a part of the manufacturing process). This eliminates the need for a homeowner or other user of fluid apparatus 716 to install fluid apparatus 716 to a fluid filled device after purchase.

It should be noted that in alternate embodiments of the present invention, fluid apparatus 716 may be attached directly to the bottommost surface 902 of a fluid filled apparatus without departing from the scope of the present invention. In such an embodiment, the fluid filled apparatus does not include feet such as feet 814 or such feet are removed prior to attachment of the fluid filled apparatus. In this embodiment, bottommost surface 902, rather than feet 814, is modified to include a plurality of apertures such as apertures 904. This allows the shaft of the respective fastener 818 to be passed through its respective channel 816 and the bottommost surface of a fluid filled device such as water heater 701 (via aperture 904) until head 830 abuts the downwardly facing surface of fluid apparatus 716. Thereafter, coupler 812 is firmly affixed to fastener 818 internal to the fluid filled device such that fluid apparatus 716 is held tightly against the fluid filled device. That is, in this embodiment, the shaft of fastener 818 passes through aperture 904 internal to body 104 of the fluid filled device. In order to affix coupler 812 to fastener 818, it may be necessary to remove an access panel on the lower end of the fluid filled device such as access panel 834. Panel 834 may be removably or nonremovably attached to body 702 via screws, hinges, snaps, etc. or via any other method commonly known in the art. When panel 834 is opened or removed, the internal components of the lower section of body 702 may be accessed. However, alternate methods of accessing the interior of the fluid-filled device may be substituted without departing from the scope of the present invention including, but not limited to, accessing such interior prior to completing manufacture of the fluid-filled device.

Figure 11:
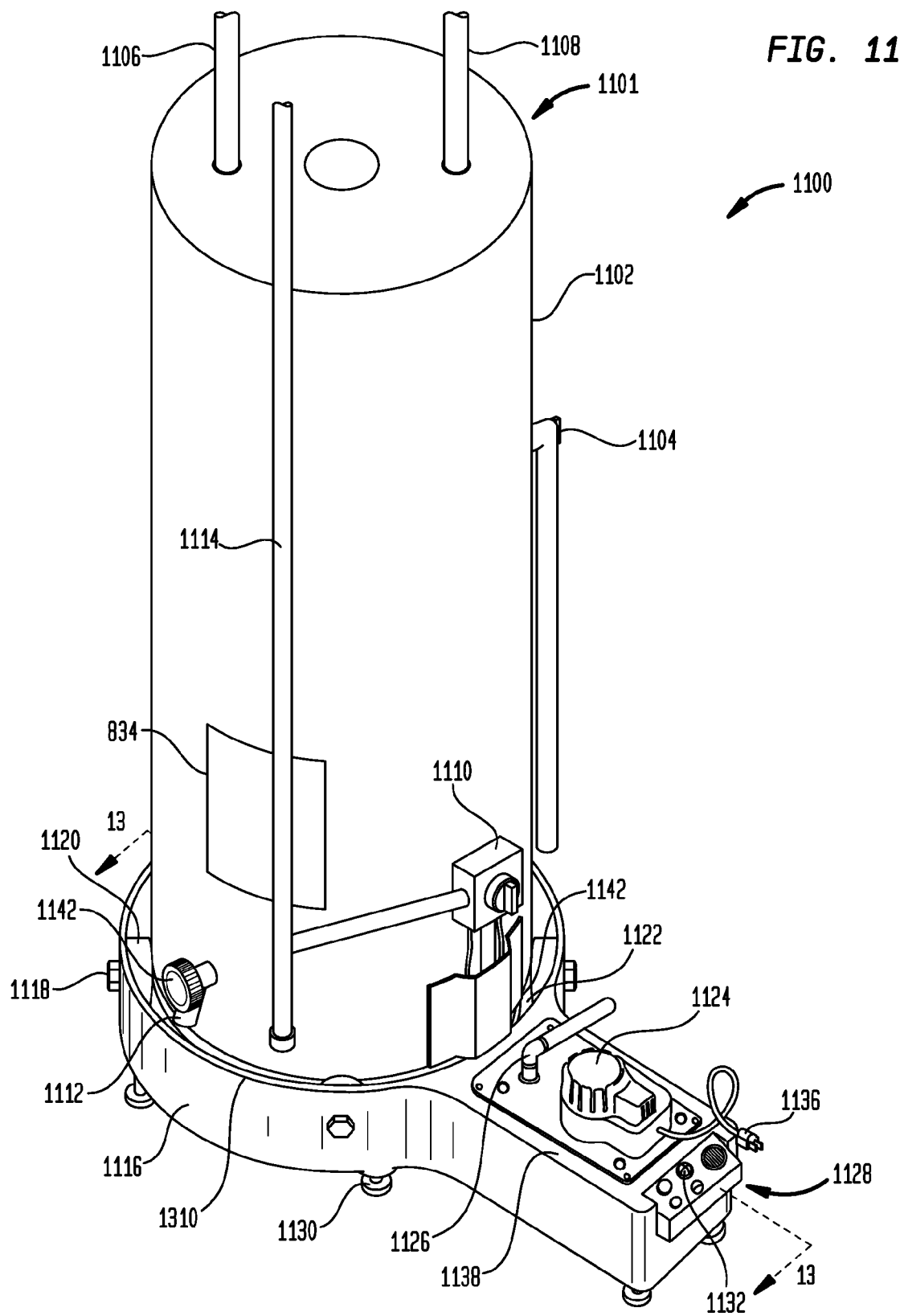
FIG. 11 is a perspective view of a water heater with an integral fluid detection and containment apparatus in accordance with an alternate embodiment of the present invention.

Turning now to FIG. 11, depicted is an alternate embodiment of a fluid filled device having an integral fluid detection and containment apparatus. Water heater assembly 1100 includes, inter alia, water heater 1101 and integral fluid apparatus 1116. In the depicted embodiment, fluid apparatus 1116 is coupled to water heater 1101 during the manufacturing process. This allows the user to purchase water heater assembly 1100 with an integral fluid apparatus 1116, thereby eliminating the need for a user to install the apparatus. Instead, fluid apparatus 1116 is installed during manufacture of water heater 1101 or otherwise prior to sale.

Water heater 1101 includes, inter alia, body 1102, valve 1104, water inlet 1106, water outlet 1108, thermostat 1110, drain 1112, gas supply inlet 1114, fluid apparatus 1116, bolts 1118, and bumpers 1120, which are substantially identical to and operate in substantially the same manner as body 702, valve 704, water inlet 706, water outlet 708, thermostat 710, drain 712, gas supply inlet 714, fluid apparatus 716, bolts 718, and bumpers 720, respectively, as described in greater detail above with respect to FIGS. 7 through 10.

Figure 13:
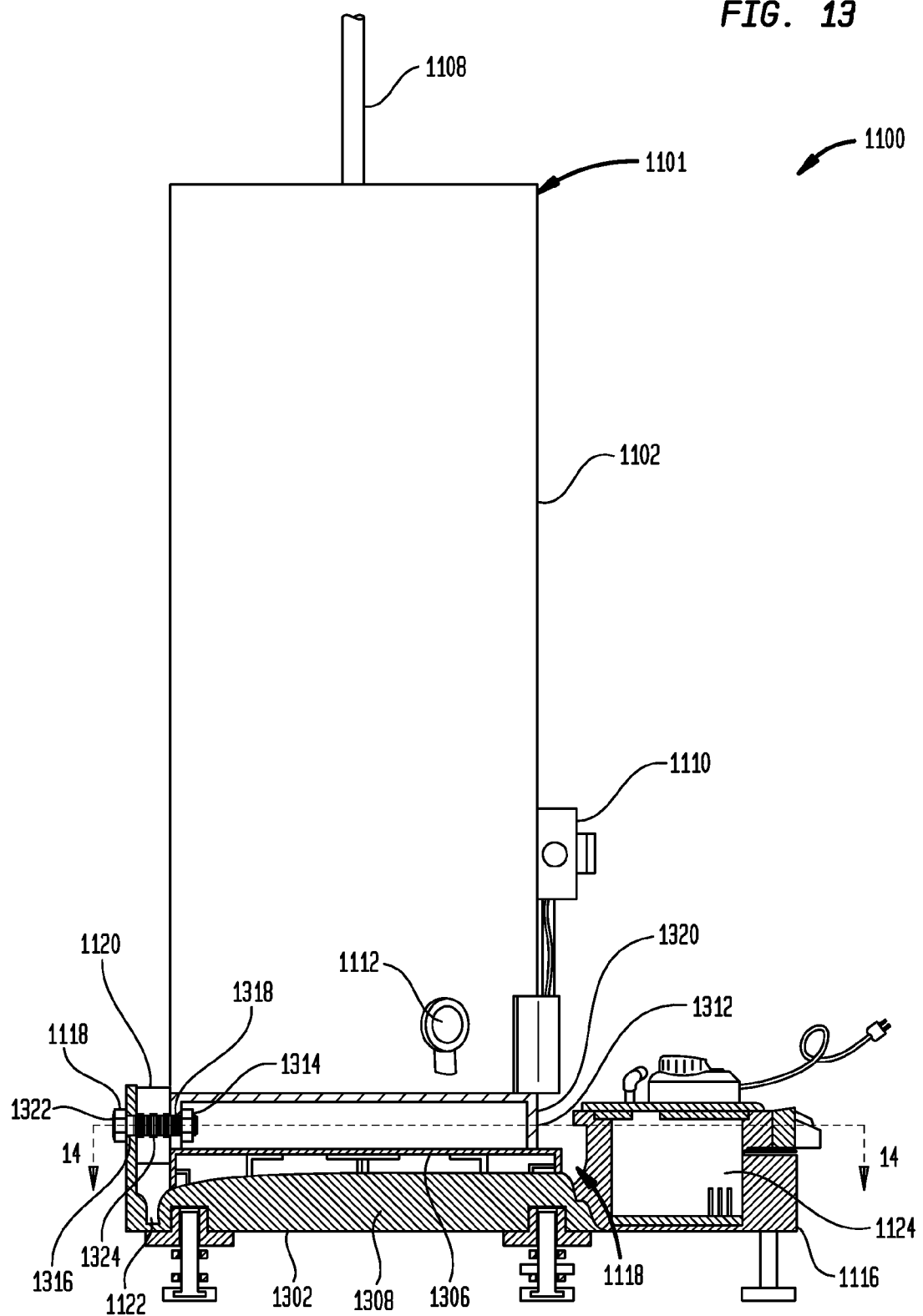
FIG. 13 is a partial cross-sectional view of the fluid detection and containment apparatus and water heater base taken along lines 13-13 of FIG. 11.
Figure 14:
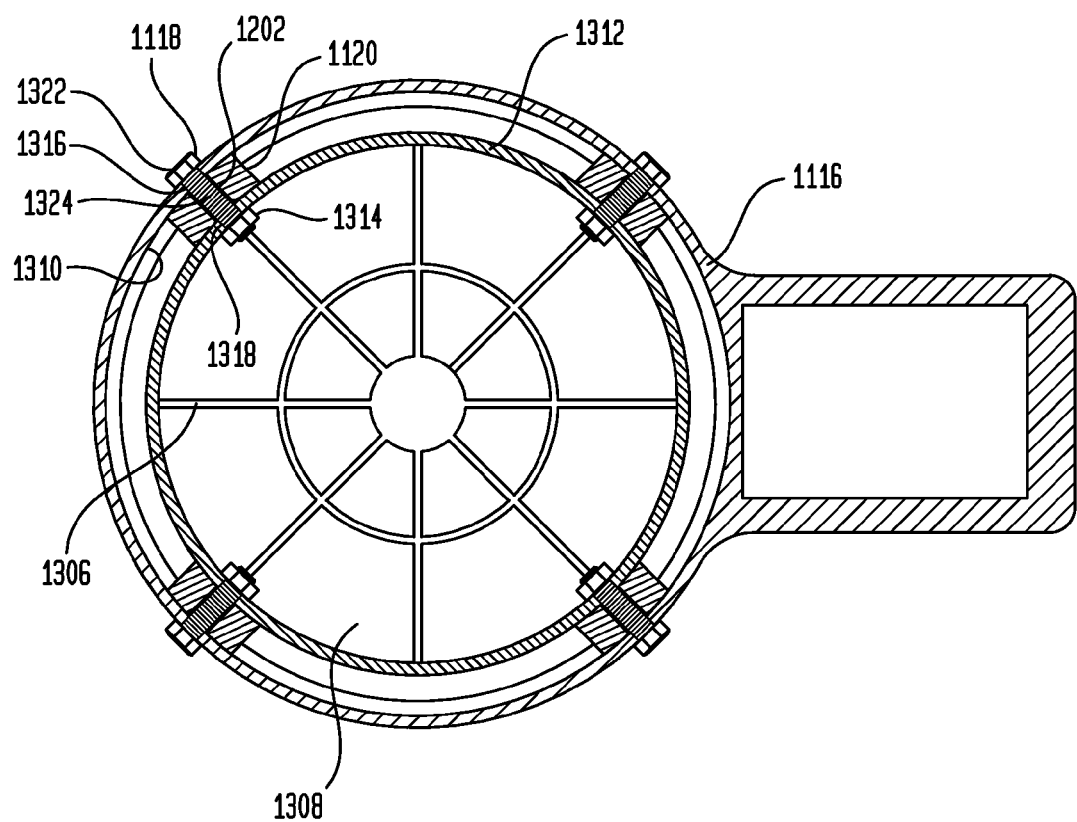
FIG. 14 is a cross-sectional view of the water heater assembly of FIG. 11 taken along lines 14-14 of FIG. 13.

Now referring to FIGS. 13 and 14, water heater 1101 includes a substantially cylindrical stand 1312 that protrudes from the bottommost surface of body 1102. In the depicted embodiment of the present invention, one or more substantially cylindrical apertures 1318 are created in stand 1312 to facilitate attachment of fluid apparatus 1116 to water heater 1101. The diameter of apertures 1318 may vary and it is selected to allow a fastener of sufficient strength to attach fluid apparatus 1116 to water heater 1101 (e.g., fastener 1118) to pass therethrough as discussed in greater detail below. If such fastener is a bolt, as is the case in the depicted embodiment, the diameter of aperture 1318 should be of sufficient size to allow the shaft of the bolt to pass therethrough, yet small enough to prevent the head of the bolt from entering same. Although the depicted embodiment includes apertures located in the stand of a water heater, apertures may be located in areas of the water heater other than the stand and/or other mechanisms for attaching a fastener may be substituted including, without limitation, rings, tabs, and the like.

Referring now to FIGS. 11 and 13, fluid apparatus 1116 includes base 1302, which is substantially identical to base 102 of fluid apparatus 100 as described in detail above with the exception that base 1102 includes an attachment mechanism for attaching fluid apparatus 1116 to water heater 1101 as described in greater detail below. The other components of fluid apparatus 1116, namely, reservoir 1142, platform 1308, exterior wall 1310, canal 1122, water displacement assembly 1124, fluid conduit 1126, frame 1306, alarm mechanism 1128, leveling mechanisms 1130, level indicator 1132, plug 1136, and base platform 1138 are also substantially identical to the components of fluid apparatus 100, namely, reservoir 104, platform 108, exterior wall 110, canal 112, water displacement assembly 114, fluid conduit 120, frame 106, alarm mechanism 118, leveling mechanisms 122, level indicator 124, plug 136, and base platform 138, respectively, with the exception of the differences discussed in greater detail herein.

Exterior wall 1310 is substantially identical to exterior wall 110 (as depicted and discussed in greater detail above with respect to FIGS. 1-3) except that exterior wall 1102 includes a plurality of substantially cylindrical, substantially horizontal apertures 1316 as best seen in FIGS. 13 and 14. That is, each aperture extends through exterior wall 1310 in a substantially cylindrical and horizontal manner. The diameter of apertures 1316 may vary and it is selected to allow a fastener of sufficient strength to attach fluid apparatus 1116 to water heater 1101 (e.g. fastener 1118) to pass therethrough. If such fastener is a bolt, as is the case in the depicted embodiment, the diameter of aperture 1316 should be of sufficient size to allow the shaft of the bolt to pass therethrough, yet small enough to prevent the head of the bolt from entering same.

In order to maximize the water captured by fluid apparatus 1116, a substantially one (1) inch gap between outwardly facing surface 1320 of stand 1312 and exterior wall inwardly facing surface 1310 is provided. Exterior wall inwardly facing surface 1310 is substantially identical to exterior wall inwardly facing surface 204 as described in greater detail above. In other words, the components of base 1302 are sized based upon the exterior dimensions of the water heater 1301 to which it will be coupled to maintain a substantially one (1) inch distance between outwardly facing surface 1320 and exterior wall inwardly facing surface 1310 around the entire perimeter of water heater 1301. To accommodate this, the diameter between opposing sides of exterior wall inwardly facing surface 1310 is two (2) inches greater than the diameter of stand 1312 of water heater 701. The substantially one (1) inch gap provides sufficient clearance to allow water traveling downwards along outwardly facing surface 1320 of stand 1312 to flow into base 1302 without splashing onto the surroundings. However, gaps greater or less than one (1) inch may be substituted without departing from the scope of the present invention.

As best seen in FIG. 14, the depicted embodiment of the present invention includes four (4) apertures 1316, however, alternate quantities may be substituted without departing from the present invention. Also, in the depicted embodiment, apertures 1316 are located substantially equidistantly around the circumference of outer wall 1310. These locations of apertures 1316 provide evenly balanced support and attachment of water heater 1101. These locations are also situated to align with apertures 1318 of stand 1312 when water heater 1301 is set atop base 1302, as discussed in further detail below. However, alternate quantities and locations of apertures 1316 and apertures 1318 may be substituted without departing from the scope of present invention.

Figure 12A:
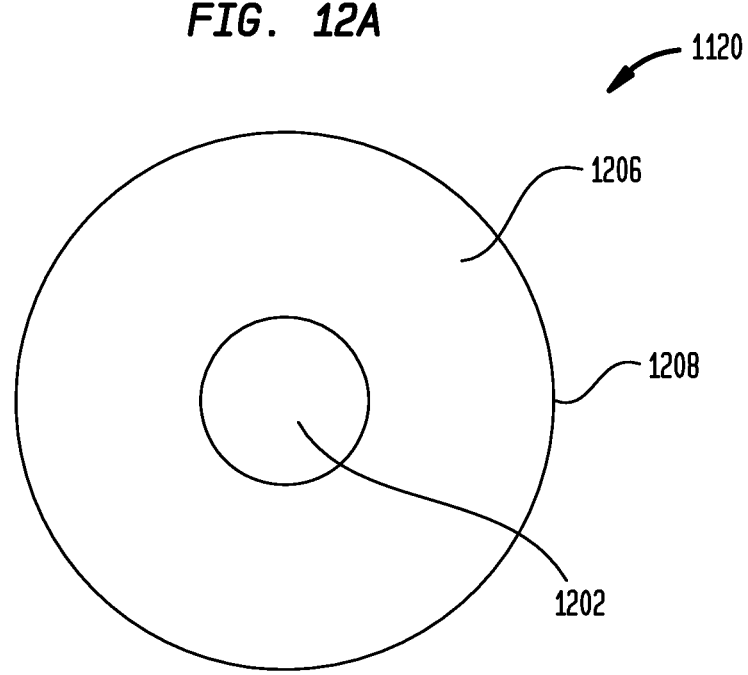
FIG. 12A is a top view of a bumper in accordance with one embodiment of the present invention.
Figure 12B:
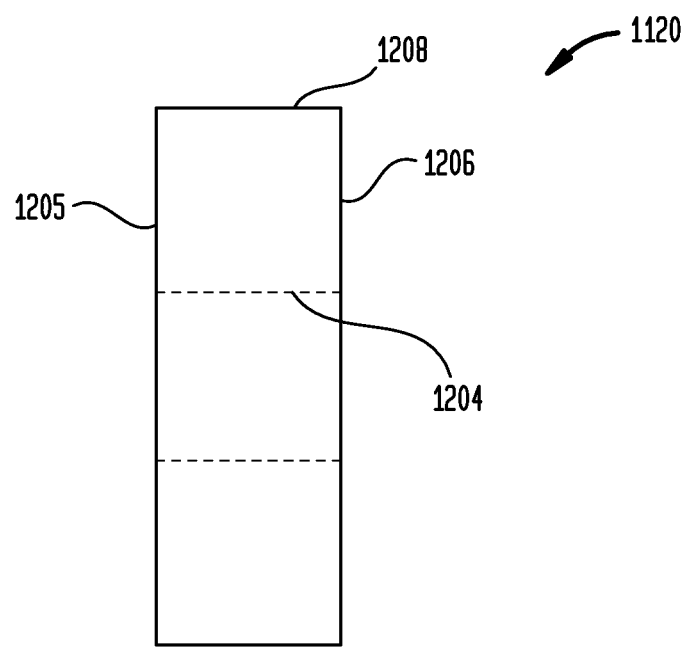
FIG. 12B is a side view of the bumper of FIG. 12A in accordance with one embodiment of the present invention.

As depicted in FIGS. 12A and 12B, bumper 1120 is a substantially cylindrical disk containing a substantially cylindrical central aperture 1202 of an appropriate diameter to allow a fastener of sufficient strength to attach fluid apparatus 1116 to water heater 1101 to pass therethrough. Bumper 1120 is constructed from any suitable semi-compressible material, including, but not limited to, rubber. Alternative materials such as . . . [[Kevin, please provide options]] may be utilized without departing from the scope of the present invention.

Aperture 1202 is bounded by inwardly facing surface 1204. Proceeding radially outward from the topmost and bottommost edges of inwardly facing surface 1204 are substantially planar surfaces 1205 and 1206, respectively. The outermost perimeter of surfaces 1205 and 1206 intersect substantially perpendicularly with outwardly facing surface 1208. In the depicted embodiment, the axial thickness of bumper 1120 is approximately one (1) inch. That is, the distance between substantially planar surfaces 1205 and 1206 is approximately one (1) inch. Additionally, the radial thickness of the cylindrical outer wall of bumper 1120 is also approximately one (1) inch. That is, the distance between inwardly facing surface 1204 and outwardly facing surface 1208 is approximately one (1) inch. As discussed in greater detail below, bumper 1120 is provided to secure the position of stand 1312 of water heater 1101 relative to fluid apparatus 1116. However, varying axial and radial thicknesses of bumper 1120 may be substituted without departing from the scope of the present invention.

Bumpers 1120 ensure that the distance between the outwardly facing surface 1320 of the stand 1312 of water heater 1101 and exterior wall inwardly facing surface 1310 of fluid apparatus 1116 is equal at each of a plurality of attachment points. While four attachment points are included in the present invention, varying quantities of attachments points can be substituted without departing from the scope of the present invention. Additionally, bumpers 1120 also ensure that water heater 1101 remains relatively stable in the event that one or more fasteners 1118 become loose or uncoupled from base 1302. For example, if an external force applies lateral pressure to the body of water heater 1101 and causes it to shift, bumpers 1120 counteract the lateral force and compress as necessary between outwardly facing surface 1320 and exterior wall inwardly facing surface 1310 to minimize or prevent movement of water heater 1101 relative to exterior wall inwardly facing surface 1310. In this manner, water heater 1101 is protected from excessive lateral movement and any damage to the water heater or fluid apparatus 1116 therefrom.

Referring back to FIG. 13, depicted is a partial cross sectional view of the attachment of fluid apparatus 1116 to water heater 1101 via a plurality of fasteners 1118. That is, the shaft of the respective fastener 1118 is passed through the respective aperture 1316 of base 1302, then through the respective aperture 1202 of bumper 1120, and then through the respective aperture 1318 of stand 1312 until head 1322 abuts the outwardly facing surface of fluid apparatus 1116. Thereafter, coupler 1314 is firmly affixed to fastener 1118 to hold fluid apparatus tightly to the fluid filled apparatus. In the depicted embodiment, fastener 1118 is a screw and coupler 1314 is a bolt that is threaded onto the end of shaft 1324 of bolt 1118 to tightly secure fluid apparatus 1116 to the fluid filled apparatus. However, alternate fasteners and couplers may be substituted without departing from the scope of the present invention. Additionally, in the depicted embodiment, four (4) fasteners and associated couplers are utilized to couple fluid apparatus 1116 to water heater 1101. However, varying quantities may be substituted without departing from the scope of the present invention. In this manner, integral fluid apparatus 1116 may be attached to a fluid-filled device prior to sale to a consumer (e.g., as a part of the manufacturing process). This eliminates the need for a homeowner or other user of fluid apparatus 1116 to install fluid apparatus 1116 to a fluid filled device after purchase.

Figure 15:
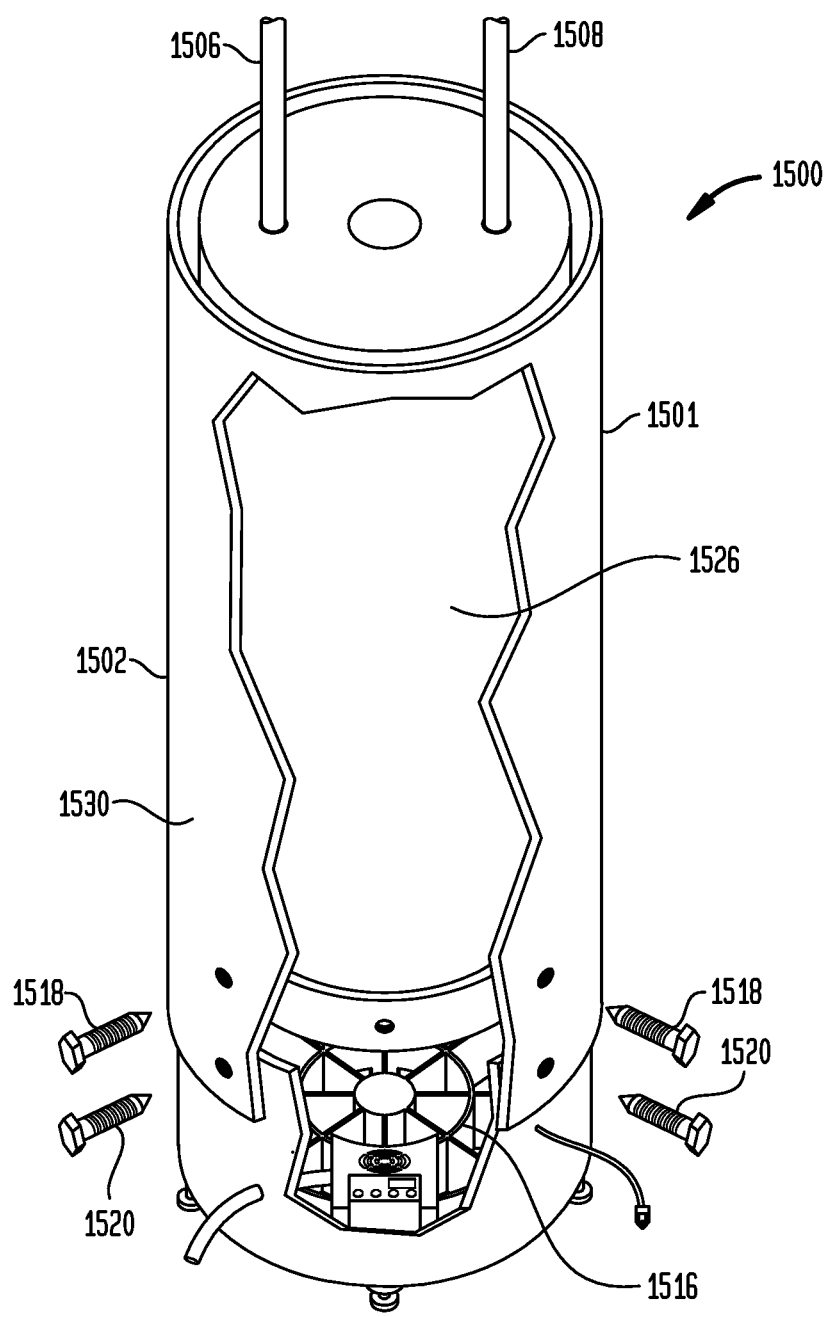
FIG. 15 is a cutaway view of a fluid apparatus with an integral fluid detection and containment apparatus in accordance with one alternate embodiment of the present invention.
Figure 18:
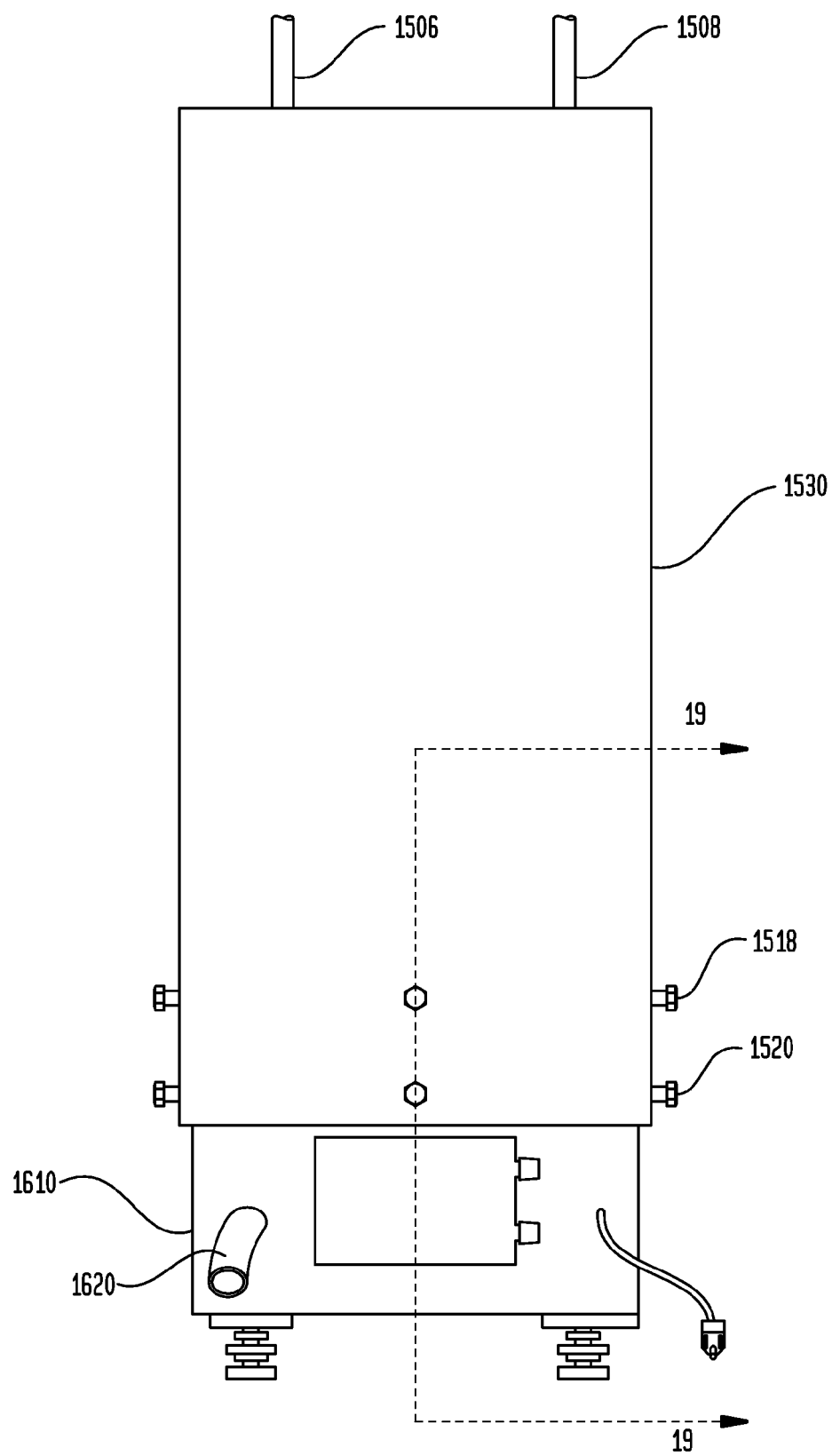
FIG. 18 is a front view of the embodiment of the present invention depicted in FIG. 15.

Turning now to FIGS. 15 and 18, depicted are perspective and front views, respectively, of yet another alternate embodiment of a fluid filled device having an integral fluid detection and containment apparatus. In the depicted embodiment, the fluid filled device is a water heater. Water heater assembly 1500 includes, inter alia, water heater 1501 and integral fluid apparatus 1516. In the depicted embodiment, fluid apparatus 1516 is coupled to water heater 1501 during the manufacturing process or is manufactured as a part of the water heater assembly 1500. This allows the user to purchase water heater assembly 1500 with an integral fluid apparatus 1516, thereby eliminating the need for a user to install the apparatus. Instead, fluid apparatus 1516 is installed during manufacture of water heater 1501 or otherwise prior to sale.

Water heater 1501 includes, inter alia, body 1502, water inlet 1506, water outlet 1508, and fluid apparatus 1516, which are substantially identical to and operate in substantially the same manner as body 702, water inlet 706, water outlet 708, and fluid apparatus 716, respectively, as described in greater detail above with respect to FIGS. 7 through 10. Water heater also includes water tank 1526, pan fasteners 1518 and fluid apparatus retainers 1520 as discussed below with respect to FIG. 19.

Figure 16:
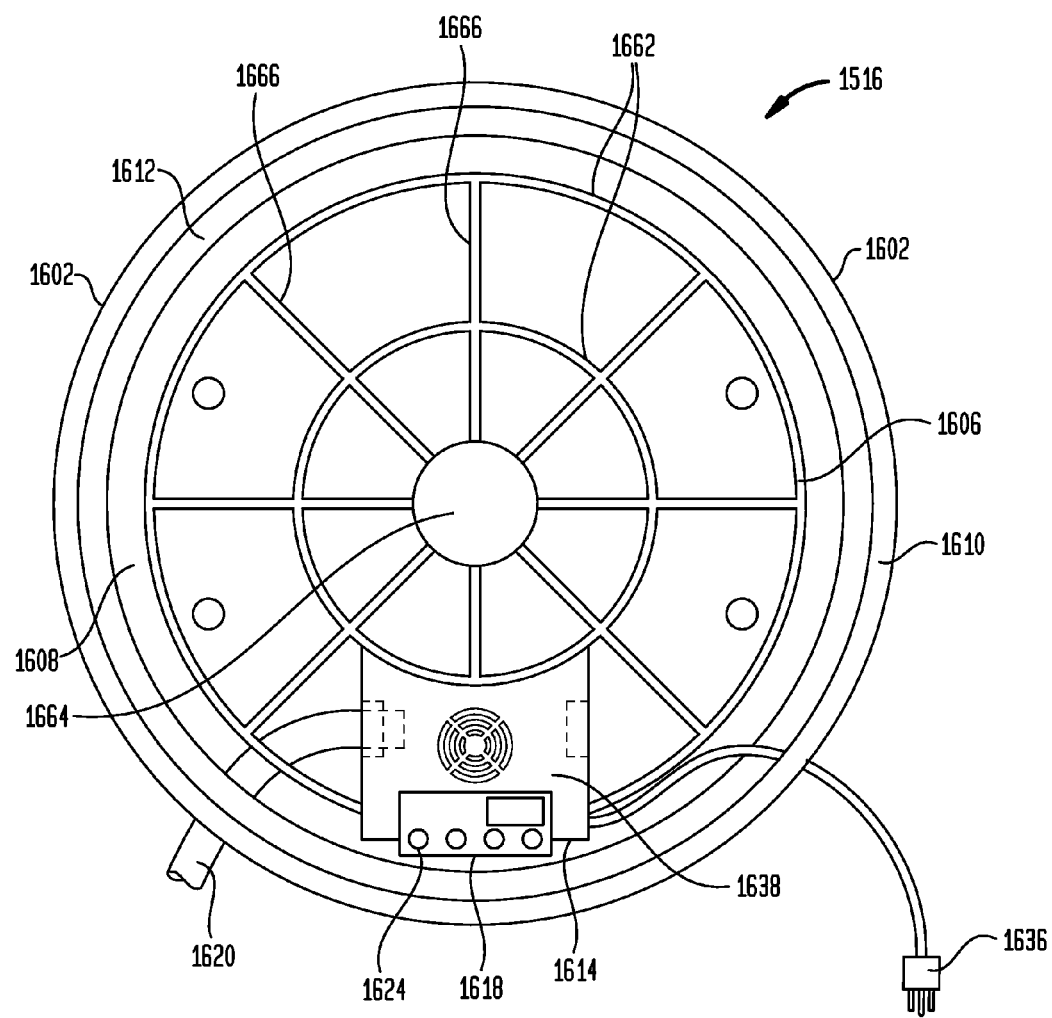
FIG. 16 is a top plan view of a fluid apparatus in accordance with the embodiment of the present invention depicted in FIG. 15.

Turning now to FIG. 16, depicted is a top view of fluid apparatus 1516 in accordance with the embodiment of the present invention depicted in FIG. 15. In one embodiment of the present invention, fluid apparatus 1516 includes base 1602, platform 1608, exterior wall 1610, canal 1612, water displacement assembly 1614, fluid conduit 1620, alarm mechanism 1618, leveling mechanisms 1622 (FIG. 19), level indicator 1624, plug 1636, and, optionally, frame 1606, which are substantially identical to and operate in substantially the same manner as base 102, platform 108, exterior wall 110, canal 112, water displacement assembly 114, fluid conduit 120, alarm mechanism 118, leveling mechanisms 122, level indicator 124, plug 136, and frame 106, as described in greater detail above with respect to FIGS. 1 through 6 with the exception that water displacement assembly 1614 is located internal to exterior wall 1610.

In embodiments including frame 1606, such as that depicted in FIGS. 15 through 19, frame 1606 includes circular supporting members 1662, central supporting member 1664, and radial supporting members 1666, which are substantially identical to and operate in substantially the same manner as circular supporting members 302, central supporting member 304, and radial supporting members 306, respectively, as described in greater detail above with respect to FIGS. 1 through 6 with the exception that portions of the outmost circular supporting member 1602 and radial supporting member 1606 have been removed in the location of water displacement assembly 1614, which is now contained completely within exterior wall 110.

Also depicted in FIG. 16 is a top view of water displacement assembly 1614. Water displacement assembly 1614 is suspended directly above, or rests within, reservoir 1604 (FIG. 19) and may be virtually any commercially available water displacement mechanism or water displacement assembly of minimal size such that water displacement assembly 1614 is capable of mounting to base 1602 and is capable of discharging fluid from a reservoir such as reservoir 1604 and capable of fitting within the confines of base 1602 and exterior wall 1610. In one embodiment of the present invention, a commercially available, low profile condensate removal pump such as that manufactured by DiversiTech having model number CP-22LP is implemented. However, other similar water displacement mechanisms or water displacement assemblies (e.g., bilge pumps, sump pumps, etc.) may be substituted without departing from the scope hereof.

Figure 17:
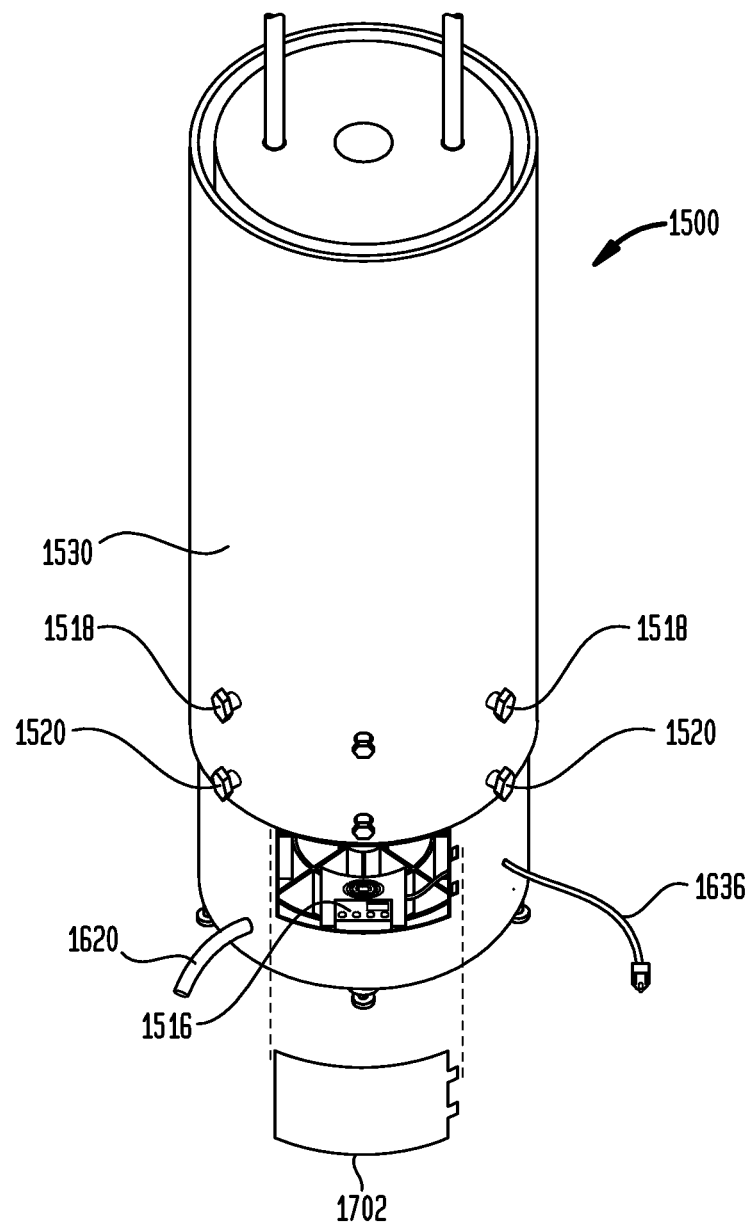
FIG. 17 is an exploded view of the embodiment of the present invention depicted in FIG. 15 illustrating a removed access panel and three suspenders.

Referring now to FIG. 17, depicted is a perspective view of water heater assembly 1500 with access panel 1702 removed. As seen in FIG. 17, fluid apparatus 1516 is mounted within water heater assembly 1500 such that alarm mechanism 1618 is located directly behind access panel 1702. Such a mounting allows alarm mechanism 1618 to be easily viewed and/or operated without dismantling water heater assembly 1500.

Fluid apparatus 1516 is retained in position via one or more fluid apparatus retainers 1520. In the depicted embodiment of the present invention, retainers 1520 are self-tapping screws inserted through the exterior casing of water heater 1501 as depicted in the exploded view of FIG. 15. Alternate retainers may be substituted without departing from the scope hereof including, without limitation, bolts.

Figure 19:
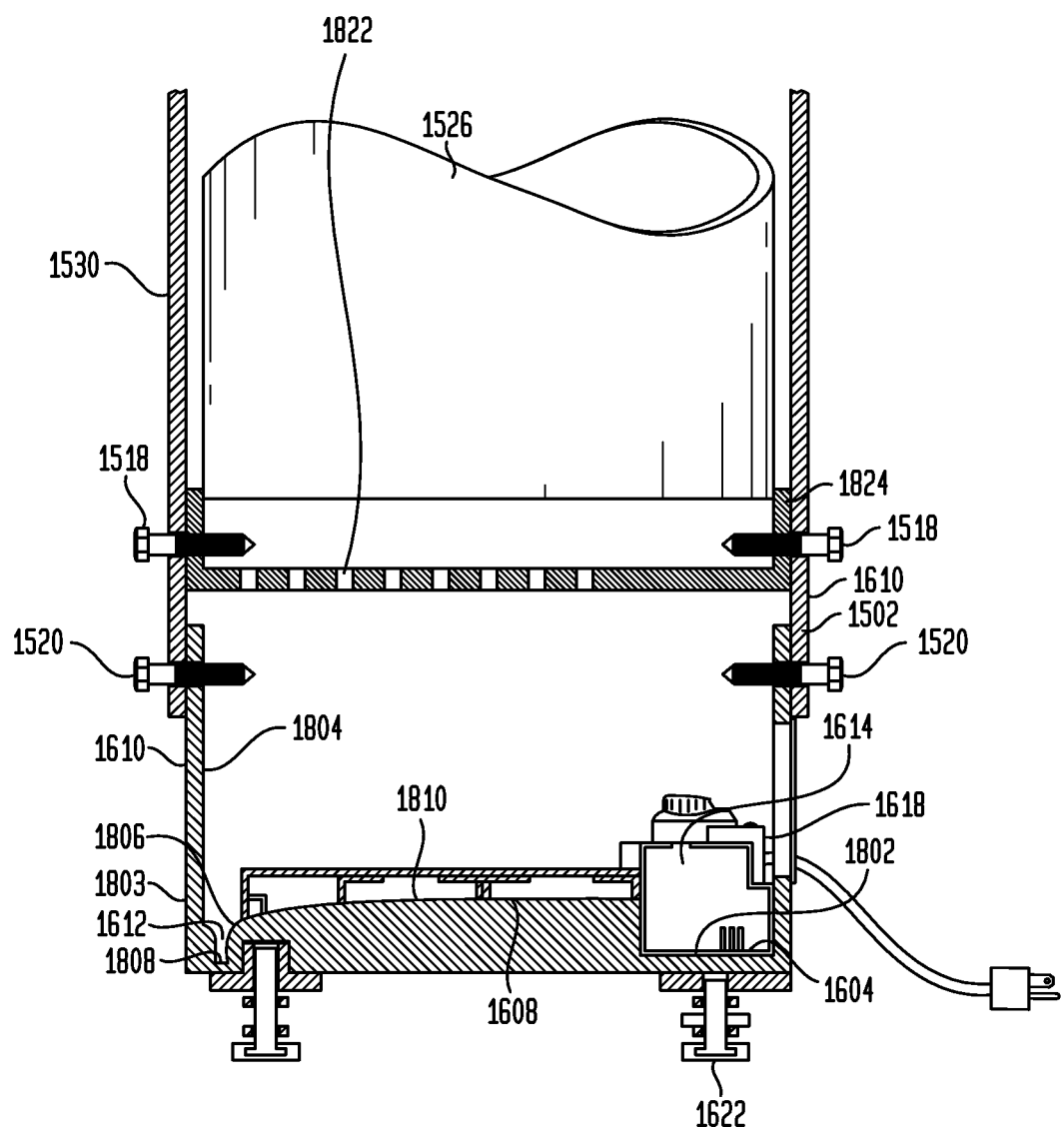
FIG. 19 is a cross-sectional side view taken along lines 19-19 of FIG. 18 illustrating the configuration of the canal, reservoir, and water displacement assembly relative to the frame and platform in accordance with the embodiment of the present invention depicted in FIG. 15.

Turning now to FIG. 19, depicted is a cross-sectional side view taken along lines 19-19 of FIG. 18 illustrating the configuration of the canal, reservoir, and water displacement assembly relative to the frame and platform in accordance with the embodiment of the present invention depicted in FIG. 15. Exterior wall 1610 is located directly inside exterior wall 1530 of water heater 1501. Exterior wall 1530 extends around the outwardly facing surface of wall 1610 and, as discussed above, is secured to fluid apparatus 1516 via a plurality of retainers 1520. That is, retainers 1520 are fastened through water heater exterior wall 1530 and fluid apparatus exterior wall 1610 to secure fluid apparatus 1516 thereto. In the depicted embodiment, fluid apparatus 1516 is located a significant distance below drainage pan 1820. However, alternate embodiments are envisioned in which the distance between drainage pan 1820, or the bottom of water tank 1526 (in embodiments of the invention that do not include a drainage pan 1820), is less or minimal without departing from the scope of the present invention.

Additionally, in some aspects of the present invention such as that depicted in FIG. 19, the bottommost end of exterior wall inwardly facing surface 1804 is tapered such that fluid in contact with such surface is directed toward canal 1612. Similarly, platform outwardly facing surfaces 1806 may also be tapered such that any fluids in contact therewith are also directed toward canal 1612. Furthermore, platform upwardly facing surface 1810 may be convex such that any fluid leak atop platform 1608 is more quickly discharged to canal 1612. However, alternate embodiments are envisioned in which upwardly facing surface 1810 is generally flat or otherwise shaped.

To further maximize drainage within fluid apparatus 1516, the canal floor 1808 and reservoir floor 1802 may be optionally tapered such that each has a diminishing height along all paths leading from base end 1803 of the first section of base 1602 to water displacement assembly 1614. That is, in the depicted embodiment, water displacement assembly 1614 is located directly above the lowest point within reservoir 1604 (i.e., the sump) such that any fluid deposited within fluid apparatus 1516 is gravitationally directed toward water displacement assembly 1614 to maximize fluid detection and drainage. However, other embodiments of the present invention are envisioned in which the canal and/or reservoir floors are generally flat or otherwise untapered.

In the depicted embodiment, water flow is also impeded by drainage pan 1820, which is optional. In the depicted embodiment, drainage pan 1820 is mounted directly below the bottom of water tank 1526. Also, in the depicted embodiment, drainage pan 1820 is a substantially circular, substantially flat piece of metal that includes a plurality of perforated holes 1822. Holes 1822 are distributed evenly across drainage pan 1820 with the exception of the portion thereof located directly above water displacement assembly 1614. The distribution of holes 1822 acts to direct water leaking from water tank 1526 to the middle of fluid apparatus 1516 and/or platform 1608 and away from electronics such as alarm mechanism 1618, thereby facilitating drainage and preventing or minimizing damage to electronics such as alarm mechanism 1618. Drainage pan 1820 also includes a substantially cylindrical outer pan lip 1824 that surrounds the perimeter of drainage pan

1820. In the depicted embodiment, the outwardly facing surface of pan lip 1824 is flush against the interior surface of exterior wall 1530, thereby preventing or minimizing water leakage between the two surfaces. However, alternate drainage pans may be substituted or the drainage pan may be omitted without departing from the scope of the present invention. As also seen in FIG. 19, drainage pain 1820 is attached to exterior wall 1530 via a plurality of pan fasteners 1518. In the depicted embodiment, pan fasteners 1518 are self-tapping screws fastened through exterior wall 1530 and pan lip 1824 such that drainage pan 1820 is supported underneath the bottommost end of water tank 1526. As further discussed below, this configuration allows water leaking from water tank 1526 to fall onto platform 1608, after which it is directed to canal 1612 and reservoir 1604 for drainage to a location exterior to water heater assembly 1500 via fluid conduit 1620 in a similar manner to that discussed above with respect to FIGS. 1-6.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:
1. A fluid-filled device with an integral fluid detection and containment apparatus comprising:
    a fluid-filled device including a water tank;
    a fluid apparatus mounted internal to said fluid-filled device, said fluid apparatus including;
        a base, said base including a canal located between an exterior wall and a centrally-located platform, said canal having a tapered floor such that fluid in contact with said floor is gravitationally directed to a reservoir located in said base;
        at least one fluid detector having at least one control point, for detecting at least one of the group consisting of a presence of said fluid, a height of said fluid, and combinations thereof for activating said control point upon such detection;
        at least one water displacement mechanism located in or proximate to said reservoir having at least one control circuit coupled to said control point, said control circuit controlling said water displacement mechanism based upon a status of said control point; and
        at least one fluid conduit in fluid communication between said reservoir and at least one drainage area;
    wherein energization of said water displacement mechanism causes said fluid in said reservoir to be discharged from said reservoir through said fluid conduit to said drainage area.
2. An apparatus according to claim 1 further comprising:
    a pan mounted internal to said fluid-filled device in a location below said water tank and above said fluid apparatus.
3. An apparatus according to claim 1, wherein said base includes at least one cavity for insertion of at least one of the group consisting of said fluid detector, said water displacement mechanism, said fluid conduit, a frame, an alarm mechanism, a leveling mechanism, a level indicator, and combinations thereof to said base.
4. An apparatus according to claim 1, wherein at least a portion of said exterior wall is raised.
5. An apparatus according to claim 1, wherein said at least one drainage area is selected from the group consisting of a sink, drain, home sewage drain, French drain, well, basement sump drain, water system outlet, and an outside environment.
6. An apparatus according to claim 1, wherein said fluid-filled device is selected from the group consisting of a hot water heater, an air conditioning unit, a dehumidifier, a humidifier, a water cooler, a planter, and an aquarium.
7. An apparatus according to claim 1, further comprising:
    an alarm mechanism for alerting a user upon detection of at least one of the group consisting of a presence of said fluid and a height of said fluid.
8. An apparatus according to claim 7, wherein said alarm mechanism includes at least one of the group consisting of a lamp, a horn, a silence switch, a reset, and combinations thereof.
9. An apparatus according to claim 1, further comprising:
    at least one leveling mechanism for adjusting a height of said base.
10. An apparatus according to claim 9, wherein said leveling mechanism is at least one of the group consisting of a leveling wedge, a leveling leg, and combinations thereof.
11. An apparatus according to claim 10, further comprising:
    a level indicator for indicating a horizontal orientation of said base.
12. An apparatus according to claim 11, wherein said level indicator is a leveling eye.
13. An apparatus according to claim 1, further comprising:
    a plug electrically coupled to at least one of the group consisting of said water displacement mechanism, said fluid detector, and combinations thereof;
    wherein power is provided to said apparatus via connection of said plug to an electrical receptacle.
14. An apparatus according to claim 1, wherein said water displacement mechanism and said fluid detector are included in a single water displacement assembly.
15. An apparatus according to claim 14, wherein said water displacement assembly further includes at least one of the group consisting of a tank, a covering, a plug, a cord, alarm mechanism wiring, a discharge aperture, a discharge aperture assembly, an intake aperture, and combinations thereof.
16. An apparatus according to claim 1, wherein said base is manufactured using at least one technique selected from the group consisting of injection molding, transfer molding, blow molding, rotational molding, thermoforming, structural foam molding, and compression molding.
17. An apparatus according to claim 1, wherein said perimeter of said base has a shape selected from the group consisting of generally teardrop, generally ovate, and generally oval.
18. An apparatus according to claim 1, wherein a first height of an upwardly facing surface of said platform is less than a second height of an upwardly extending surface of said exterior wall.
19. An apparatus according to claim 1, wherein at least one of the group consisting of an inwardly facing surface of said exterior wall, an outwardly facing surface of said platform, and combinations thereof is tapered to facilitate drainage to said canal.
20. An apparatus according to claim 1, wherein an upwardly facing surface of said platform is convex.
21. An apparatus according to claim 1, wherein at least one of the group consisting of a floor of said canal, a floor of said reservoir, and combinations thereof are tapered to provide a diminishing height from a first end of said first section of said base to at least one of the group consisting of said water displacement mechanism, said fluid detector, and combinations thereof.

22. An apparatus according to claim 1, wherein said fluid conduit is selected from the group consisting of a hose and a tube.

23. An apparatus according to claim 1, wherein said fluid detector has an adjustable height.

24. An apparatus according to claim 1, wherein said water displacement mechanism is at least one of the group consisting of a bilge pump, a sump pump, a condensate pump, and combinations thereof.

25. An apparatus according to claim 1, wherein said water displacement assembly is a condensate removal assembly.

* * * * *